US008437379B2

(12) United States Patent
Nanri

(10) Patent No.: US 8,437,379 B2
(45) Date of Patent: May 7, 2013

(54) MOBILE STATION APPARATUS, BASE STATION APPARATUS, AND COMMUNICATION CONTROL METHOD FOR RADIO COMMUNICATION SYSTEM

(75) Inventor: Masahiko Nanri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 12/921,709

(22) PCT Filed: Mar. 10, 2009

(86) PCT No.: PCT/JP2009/001079
§ 371 (c)(1),
(2), (4) Date: Sep. 9, 2010

(87) PCT Pub. No.: WO2009/116247
PCT Pub. Date: Sep. 24, 2009

(65) Prior Publication Data
US 2011/0007779 A1      Jan. 13, 2011

(30) Foreign Application Priority Data
Mar. 19, 2008   (JP) .................................. 2008-071999

(51) Int. Cl.
*H04B 1/00*          (2006.01)

(52) U.S. Cl.
USPC ........... 375/133; 375/130; 375/132; 375/135; 375/136; 455/41.2

(58) Field of Classification Search .................. 375/130, 375/132, 133, 135, 136; 455/41.2
See application file for complete search history.

(56) References Cited

U.S. PATENT DOCUMENTS

2008/0212532 A1* 9/2008 Heo et al. ....................... 370/330
2009/0296563 A1   12/2009 Kishiyama et al.
2009/0316758 A1* 12/2009 Ahn et al. ...................... 375/135

FOREIGN PATENT DOCUMENTS

| JP | 2006333358 A | 12/2006 |
| JP | 2007019985 A | 1/2007 |
| JP | 2007-89113 A | 4/2007 |

OTHER PUBLICATIONS

NEC Group, "Performance Evaluation of FH Schemes for EUTRA Uplink," R1-074156, Agenda Item: 6.2.5, TSG-RAN WG1#50Bis, Shanghai, China, Oct. 8-12, 2007, 5 pages.
Alcatel-Lucent, "Discussion of Inter-Subframe Frequency Hopping," 3GPP TSG-RAN WG1 #51 R1-074993, Jeju, Korea, Nov. 5-9, 2007, 4 pages.
Panasonic, Samsung, Etri, "Way forward on the Cyclic Shift Hopping for PUCCH," 3GPP TSG RAN WG1 Meeting #52 R1-080983, Sorrento, Italy, Feb. 11-15, 2008, 2 pages.
International Search Report relating to International Application No. PCT/JP2009/001079, mailed May 26, 2009, 4 pages.

* cited by examiner

*Primary Examiner* — Leon Flores
(74) *Attorney, Agent, or Firm* — Seed IP Law Group PLLC

(57) ABSTRACT

Frequency hopping is appropriately applied even to a communication format involving a small number of minimum hopping units in one transmission unit according to various conditions, thereby enhancing receiving performance. When frequency hopping is applied to a communication format along which transmission is performed on a per-subframe basis, the subframe including a first slot and a second slot, intra-subframe frequency hopping (Intra-FH) is not applied to first transmission according to the number of retransmission operations, and transmission data of two slots are mapped to the same frequency band. Frequency hopping (Inter/Intra-FH) including inter-subframe frequency hopping and intra-subframe frequency hopping in combination is applied solely to a retransmission symbol used for retransmission (first retransmission and subsequent retransmission), and the transmission data are mapped to different frequency bands on a per-slot basis.

15 Claims, 18 Drawing Sheets

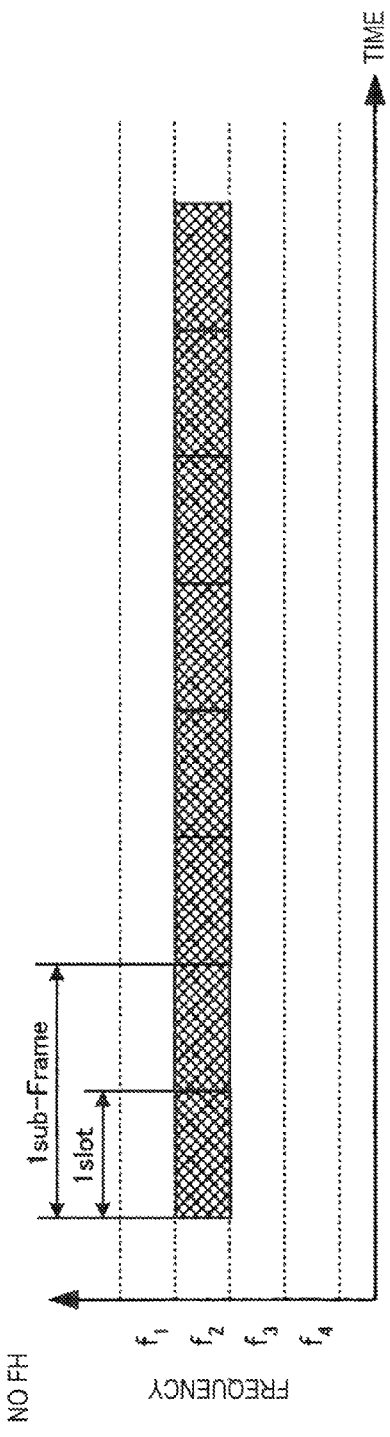
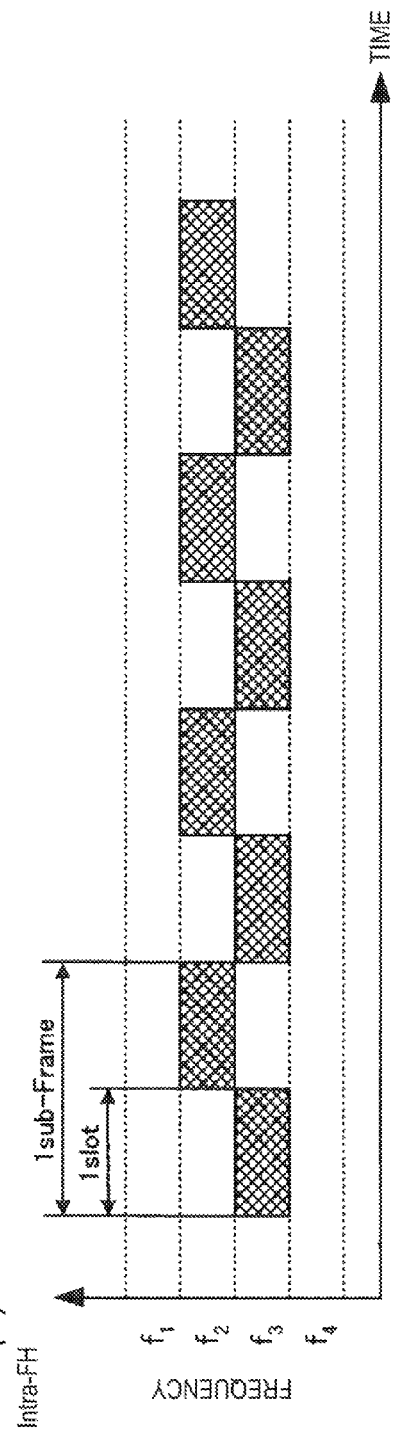
FIG. 3 (a) NO FH
FIG. 3 (b) Intra-FH

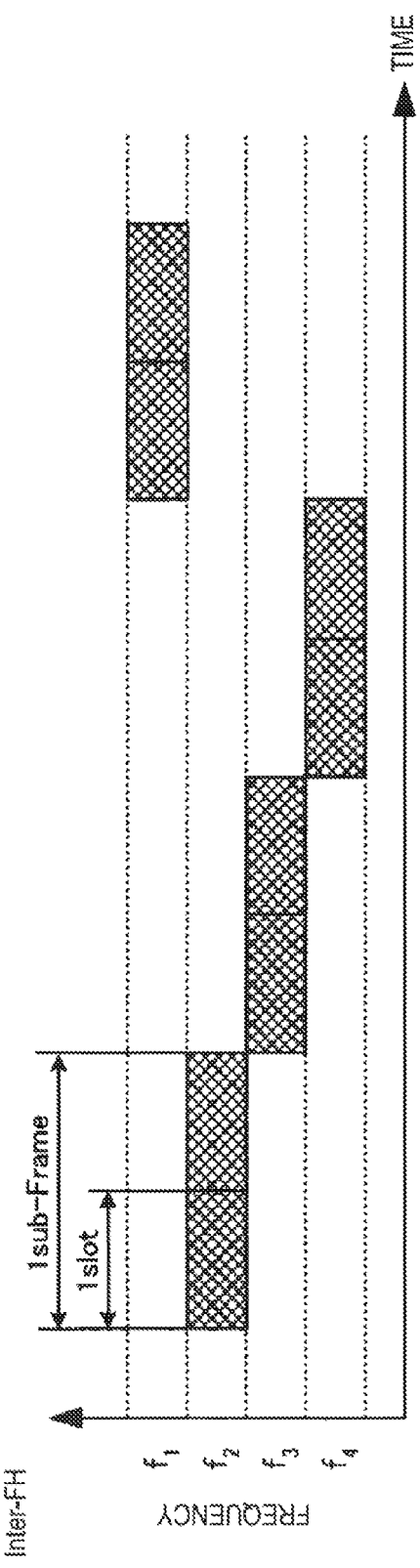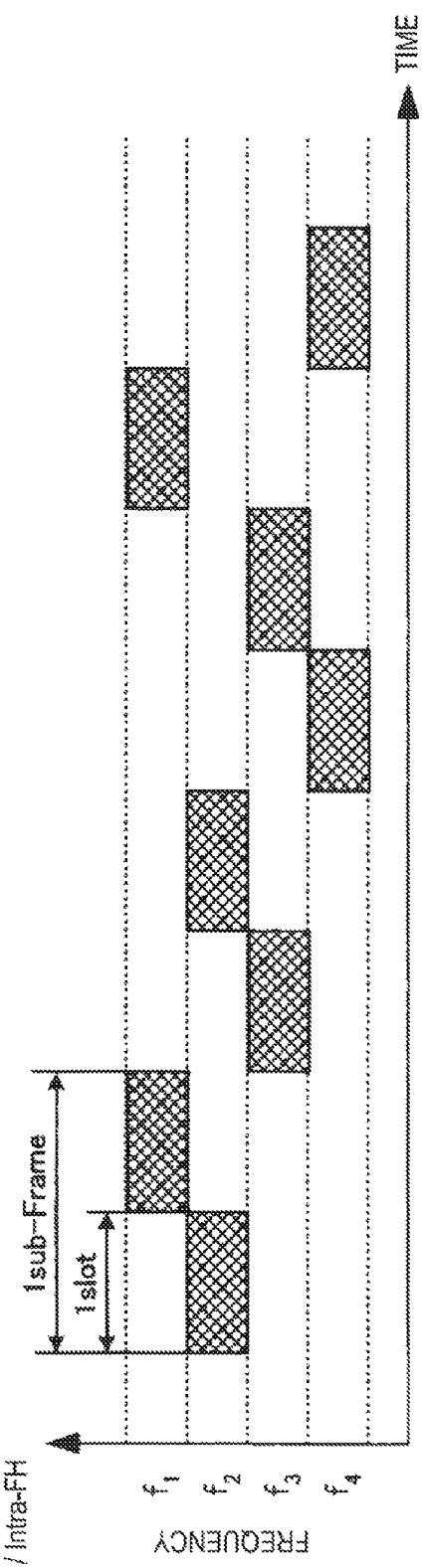
FIG. 3(c) Inter-FH
FIG. 3(d) Inter/Intra-FH

FIG. 12

| NUMBER OF TRANSMISSION OPERATIONS | NUMBER OF SLOTS $n_x$ ALLOCATED TO $f_x$ | NO FH | Intra-FH | Inter-FH | Inter / Intra-FH | FIRST EMBODIMENT |
|---|---|---|---|---|---|---|
| FIRST TRANSMISSION (TWO SLOTS) | 0 | $\frac{N-1}{N}$ | $\frac{N-2}{N}$ | $\frac{N-1}{N}$ | $\frac{N-2}{N}$ | $\frac{N-1}{N}$ |
| | 1 | 0 | $\frac{2}{N}$ | 0 | $\frac{2}{N}$ | 0 |
| | 2 | $\frac{1}{N}$ | 0 | $\frac{1}{N}$ | 0 | $\frac{1}{N}$ |
| FIRST RETRANSMISSION (FOUR SLOTS) | 0 | $\frac{N-1}{N}$ | $\frac{N-2}{N}$ | $\left(\frac{N-1}{N}\right)^2$ | $\left(\frac{N-2}{N}\right)^2$ | $\frac{N-1}{N}\cdot\frac{N-2}{N}$ |
| | 1 | 0 | 0 | 0 | $\frac{N-2}{N}\cdot\frac{2}{N}\cdot C_1$ | $\frac{N-1}{N}\cdot\frac{2}{N}$ |
| | 2 | 0 | $\frac{2}{N}$ | $\frac{N-1}{N}\cdot\frac{1}{N}\cdot C_1$ | $\left(\frac{2}{N}\right)^2$ | $\frac{1}{N}\cdot\frac{N-2}{N}$ |
| | 3 | 0 | 0 | 0 | 0 | $\frac{1}{N}\cdot\frac{2}{N}$ |
| | 4 | $\frac{1}{N}$ | 0 | $\left(\frac{1}{N}\right)^2$ | 0 | 0 |
| SECOND RETRANSMISSION (SIX SLOTS) | 0 | $\frac{N-1}{N}$ | $\frac{N-2}{N}$ | $\left(\frac{N-1}{N}\right)^3$ | $\left(\frac{N-2}{N}\right)^3$ | $\frac{N-1}{N}\left(\frac{N-2}{N}\right)^2$ |
| | 1 | 0 | 0 | 0 | $\left(\frac{N-2}{N}\right)^2\cdot\frac{2}{N}\cdot C_1$ | $\frac{N-1}{N}\cdot\frac{N-2}{N}\cdot\frac{2}{N}\cdot C_1$ |
| | 2 | 0 | 0 | $\left(\frac{N-1}{N}\right)^2\cdot\frac{1}{N}\cdot C_1$ | $\frac{N-2}{N}\left(\frac{2}{N}\right)^2\cdot C_2$ | $\frac{N-1}{N}\left(\frac{2}{N}\right)^2+\frac{1}{N}\left(\frac{N-2}{N}\right)^2$ |
| | 3 | 0 | $\frac{2}{N}$ | 0 | $\left(\frac{2}{N}\right)^3$ | $\frac{N-1}{N}\cdot\frac{N-2}{N}\cdot\frac{2}{N}\cdot C_1$ |
| | 4 | 0 | 0 | $\frac{N-1}{N}\left(\frac{1}{N}\right)^2\cdot C_2$ | 0 | $\frac{1}{N}\left(\frac{2}{N}\right)^2$ |
| | 5 | 0 | 0 | 0 | 0 | 0 |
| | 6 | $\frac{1}{N}$ | 0 | $\left(\frac{1}{N}\right)^3$ | 0 | 0 |

FIG. 13

| NUMBER OF TRANSMISSION OPERATIONS | NUMBER OF SLOTS $n_2$ ALLOCATED TO $f_2$ | NO FH | Intra-FH | Inter-FH | Inter/Intra-FH | FIRST EMBODIMENT |
|---|---|---|---|---|---|---|
| FIRST TRANSMISSION (TWO SLOTS) | 0 | 3/4 | 1/2 | 3/4 | 1/2 | 3/4 |
| | 1 | 0 | 1/2 | 0 | 1/2 | 0 |
| | 2 | 1/4 | 0 | 1/4 | 0 | 1/4 |
| FIRST RETRANSMISSION (FOUR SLOTS) | 0 | 3/4 | 1/2 | 9/16 | 1/4 | 3/8 |
| | 1 | 0 | 0 | 0 | 2/4 | 3/8 |
| | 2 | 0 | 1/2 | 6/16 | 1/4 | 1/8 |
| | 3 | 0 | 0 | 0 | 0 | 1/8 |
| | 4 | 1/4 | 0 | 1/16 | 0 | 0 |
| SECOND RETRANSMISSION (SIX SLOTS) | 0 | 3/4 | 1/2 | 27/64 | 1/8 | 3/16 |
| | 1 | 0 | 0 | 0 | 3/8 | 6/16 |
| | 2 | 0 | 0 | 27/64 | 3/8 | 4/16 |
| | 3 | 0 | 1/2 | 0 | 1/8 | 2/16 |
| | 4 | 0 | 0 | 9/64 | 0 | 1/16 |
| | 5 | 0 | 0 | 0 | 0 | 0 |
| | 6 | 1/4 | 0 | 1/64 | 0 | 0 |

FIRST TRANSMISSION

RETRANSMISSION

MOBILE STATION APPARATUS, BASE STATION APPARATUS, AND COMMUNICATION CONTROL METHOD FOR RADIO COMMUNICATION SYSTEM

TECHNICAL FIELD

The present invention relates to a mobile station apparatus and a base station apparatus used in mobile communication, or the like, as well as to a communication control method for a radio communication system.

BACKGROUND ART

In relation to a radio communication system for mobile communication, such as a portable phone, it has been contemplated to improve a transmission rate by means of various multiplexing techniques. In connection with a recent radio communication system for use with mobile communication, a frequency multiplexing scheme, such as an OFDM (Orthogonal Frequency Division Multiplexing), that is used also in; for instance, a wireless LAN and a digital terrestrial broadcasting, has been under consideration. Adopting the frequency multiplexing scheme makes it possible to prevent deterioration of transmission quality, which would otherwise be caused by fading, or the like, and to speed up and enhance quality of radio transmission. In order to improve fading resistance, frequency hopping (FH) is sometimes adopted into the frequency multiplexing scheme, such as an OFDM. The frequency hopping is a technique of hourly changing a frequency band to be used among a plurality of frequency bands, thereby preventing use of only a specific frequency band and preventing deterioration of performance, which would otherwise be caused by frequency selective fading.

For instance, Patent Document 1 shows a proposal of a method for reducing interference with another device utilizing the same radio communication system by shifting a frequency hopping period of a retransmission packet in a radio communication system, such as Bluetooth (Registered Trademark), that performs repetition in a time domain (also called a "Time spreading scheme") and frequency hopping.

FIG. 19 shows example operation of the related art described in connection with Patent Document 1. FIG. 19(a) shows a frequency hopping pattern at the time of first transmission. An upper chart shows a desired signal, and a lower chart shows an interference signal (a signal which is intended for another device and which will interfere with a concerned device). In the example, the number of repetitions (Repetition Factor: RPF) to be performed in a time domain is set to two. In FIG. 19(a), when attention is paid to; for instance, a packet (1), a first packet located in a frequency band f1 and a second packet located in f2 are understood to be arranged as desired signals in the same time and frequency band as that of the interference signal. The same also applies to a packet (4). In such a state, a desired signal suffers great interference by the interference signal, so that a receiving side encounters difficulty in demodulating the desired signal.

For this reason, in the related art described in connection with Patent Document 1, a period of frequency hopping is shifted for a retransmission packet as shown in: FIG. 19(b). When interference appearing in FIG. 19(b) is observed, a first packet of a packet (1) of the desired signal, a second packet of a packet (3) of the same signal, a first packet of a packet (4) of the same signal, and a second packet of a packet (6) of the same signal suffer interference by the interference signal. However, in each of the packets, not both of the packets resultant from repetition suffered from interference. Therefore, it becomes possible to generate received data by demodulating the packet not subjected to interference.

Adoption of frequency hopping has been under consideration even in connection with an uplink channel of a 3GPP Long Term Evolution (hereinafter abbreviated as an "LTE") network that is the next generation mobile communication standards. When a frame format for an uplink channel of the LTE network is viewed in a direction of a time axis, one slot includes seven transmission symbols, and two slots make up one subframe. Further, only one reference signal that is to serve as a pilot signal is arranged at the center of each slot (including seven symbols).

Adopting frequency hopping effected on a per-slot basis or a per-subframe basis as frequency hopping has been under consideration in connection with such an uplink channel of the LTE network. It has generally been said that a frequency interleave effect is yielded by adoption of frequency hopping, to thus improve a throughput.

Patent Document 1: JP-A-2006-333358

DISCLOSURE OF THE INVENTION

Problem that the Invention is to Solve

However, when frequency hopping is applied to the uplink channel of the LTE network, the minimum unit of hopping is a slot. Hopping operation is performed with only one transmission unit; namely, only two slots in one subframe. Further, repetition in a time domain, such as that described in connection with the related art of Patent Document 1, is not performed. Therefore, if slots are assigned to different frequency bands on a time axis by means of frequency hopping when a receiving environment for some frequency bands (a condition of a propagation path) is deteriorated by frequency selective fading, a probability of demodulation becoming difficult can often be increased. Therefore, when frequency hopping is uniformly adopted in such a condition, receiving performance will be deteriorated according to various conditions, such as occurrence/nonoccurrence of retransmission and an encoding ratio. This also applies to another communication format that includes a small number of minimum hopping units in one transmission unit.

The present invention has been conceived in light of the circumstance and aims at providing a mobile station apparatus and a base station apparatus that can appropriately apply frequency hopping to a communication format including a small number of minimum hopping units in one transmission unit according to various conditions and that can enhance receiving performance, as well as providing a communication control method for a radio communication system.

Means for Solving the Problem

The present invention provides, as a first mode, a mobile station apparatus of a radio communication system that performs transmission on a per-subframe basis, a subframe including a first slot and a second slot which are contiguous to each other in time; that uses a communication format capable of performing frequency hopping for allocating the first and second slots to different frequency bands on a per-slot basis or a per-subframe basis; and that retransmits the first subframe in a subsequent second subframe when an error is detected in a signal transmitted in the first subframe, the mobile station apparatus comprising: a control channel signal receiving section that receives a control channel signal reported from a base station apparatus; a frequency band mapping section that maps a frequency band of transmission data according to frequency hopping information included in the control channel signal; and a transmission section that transmits the mapped transmission data to the base station apparatus, wherein the frequency band mapping section performs at least either intra-subframe frequency hopping for allocating a first slot and a second slot of the first subframe to a single frequency band and allocating a first slot and a second slot of the second subframe to mutually-different frequency bands or inter-subframe frequency hopping for allocating the first subframe and the second subframe to mutually-different frequency bands.

Intra-subframe frequency hopping is thereby not applied to the first subframe to be transmitted first time, and the first slot and the second slot of the first subframe are allocated to the same frequency band, whereby a possibility of the slots being mapped to a frequency band subject to influence of frequency selective fading can be lessened. Further, in this case, a degree of accuracy of channel estimation can be enhanced, and receiving performance can be improved. At least either inter-subframe frequency hopping or intra-subframe frequency hopping is applied to the second subframe to be retransmitted, whereby a possibility of the respective slots being mapped to a frequency band subject to influence of frequency selective fading can be reduced. Moreover, in this case, retransmission combination processing is performed by use of a retransmission symbol, whereby high receiving performance is exhibited. As above, a high throughput can be comprehensively acquired.

The present invention provides, as a second mode, a mobile station apparatus of a radio communication system that performs transmission on a per-subframe basis, a subframe including a first slot and a second slot which are contiguous to each other in time; that uses a communication format capable of performing frequency hopping for allocating the first and second slots to different frequency bands on a per-slot basis or a per-subframe basis; and that retransmits the first subframe in a subsequent second subframe when an error is detected in a signal transmitted in the first subframe, the mobile station apparatus comprising: a control channel signal receiving section that receives a control channel signal reported from a base station apparatus; a frequency band mapping section that maps a frequency band of transmission data according to frequency hopping information included in the control channel signal; and a transmission section that transmits the mapped transmission data to the base station apparatus, wherein the frequency band mapping section performs intra-subframe frequency hopping for allocating a first slot and a second slot of the first subframe to a single frequency band when an encoding ratio of the transmission data is greater than a predetermined threshold value and allocating the first slot and the second slot to mutually-different frequency bands when the encoding ratio is equal to or smaller than the predetermined threshold value; and the frequency band mapping section performs at least either intra-subframe frequency hopping for allocating a first slot and a second slot of the second subframe to mutually-different frequency bands or inter-subframe frequency hopping for allocating the first subframe and the second subframe to mutually-difference frequency bands.

Intra-subframe frequency hopping is thereby not applied to the first subframe to be transmitted first time according to the encoding ratio of the transmission data when the encoding ratio is larger than the predetermined threshold value. The first slot and the second slot of the first subframe are allocated to the same frequency band, whereby a possibility of the slots being mapped to a frequency band subject to influence of frequency selective fading can be lessened. In the meantime, when the encoding ratio is equal to or smaller than the predetermined threshold value, high error correction capability is exhibited. Hence, the two slots can be prevented from being continually mapped to the frequency band subject to influence of frequency selective fading, by application of intra-subframe frequency hopping. At least either inter-subframe frequency hopping or intra-subframe frequency hopping is applied to the second subframe to be retransmitted, whereby a possibility of the respective slots being mapped to a frequency band subject to influence of frequency selective fading can be reduced. As above, a high throughput can be comprehensively acquired.

The present invention also provides, as a third mode, a mobile station apparatus of a radio communication system that performs transmission on a per-subframe basis, the subframe including a first slot and a second slot which are contiguous to each other in time and that uses a communication format capable of performing frequency hopping for allocating the first and second slots to different frequency bands on a per-slot basis or a per-subframe basis, the mobile station apparatus comprising: a control channel signal receiving section that receives a control channel signal reported from a base station apparatus; a frequency band mapping section that maps a frequency band of transmission data according to frequency hopping information included in the control channel signal; and a transmission section that transmits the mapped transmission data to the base station apparatus, wherein the frequency band mapping section performs intra-subframe frequency hopping for allocating the first slot and the second slot of the subframe to a single frequency band when a Doppler frequency of the transmission data is larger than a predetermined threshold value and allocating the first slot and the second slot of the subframe to mutually-different frequency bands when the Doppler frequency is equal to or smaller than the predetermined threshold value.

In an environment of low speed movement involving a low Doppler frequency, it thereby becomes possible to prevent two slots from being continually mapped to a frequency band subject to influence of frequency selective fading by application of intra-subframe frequency hopping. In an environment of high speed movement involving a high Doppler frequency, it thereby becomes possible to prevent occurrence of a demodulation error, which would otherwise be caused by phase fluctuations between slots in a subframe, by making application of intra-subframe frequency hopping indispensable. It thereby becomes possible to enhance a possibility of a superior throughput being obtained.

The present invention also provides, as a fourth mode, the first or second mobile station apparatus, wherein the frequency band mapping section performs intra-subframe frequency hopping for allocating the first slot and the second slot of the first subframe and the first slot and the second slot of the second subframe to the single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

The present invention provides, as a fifth mode, a base station apparatus of a radio communication system that performs transmission on a per-subframe basis, a subframe including a first slot and a second slot which are contiguous to each other in time; that uses a communication format capable of performing frequency hopping for allocating the first and second slots to different frequency bands on a per-slot basis or a per-subframe basis; and that retransmits the first subframe in a subsequent second subframe when an error is detected in a signal transmitted in the first subframe, the base station apparatus comprising: a receiving section that receives a signal transmitted from a mobile station apparatus; a frequency hopping pattern determination section that determines application of frequency hopping with regard to transmission data transmitted from the mobile station apparatus and that determines a frequency hopping pattern; a retransmission count acquisition section that acquires a number of times where the transmission data is retransmitted; and a control channel signal transmission section that generates a control channel signal including frequency hopping information for instructing the frequency hopping pattern and that transmits the control channel signal to the mobile station apparatus, wherein the frequency hopping pattern determination section determines, from the number of times where the transmission data is retransmitted, a frequency hopping pattern for performing at least either intra-subframe frequency hopping for allocating to a single frequency band a first slot and a second slot of the first subframe to be transmitted first time and allocating a first slot and a second slot of the second subframe to be retransmitted to mutually-different frequency bands or inter-subframe frequency hopping for allocating the first subframe and the second subframe to mutually-different frequency bands.

Intra-subframe frequency hopping is thereby not applied to the first subframe to be transmitted first time, and the first slot and the second slot of the first subframe are allocated to the same frequency band, whereby a possibility of the slots being mapped to a frequency band subject to influence of frequency selective fading can be lessened. Further, in this case, a degree of accuracy of channel estimation can be enhanced, and receiving performance can be improved. At least either inter-subframe frequency hopping or intra-subframe frequency hopping is applied to the second subframe to be retransmitted, whereby a possibility of the respective slots being mapped to a frequency band subject to influence of frequency selective fading can be reduced. Moreover, in this case, retransmission combination processing is performed by use of a retransmission symbol, whereby high receiving performance is exhibited. As above, a high throughput can be comprehensively acquired.

The present invention also provides, as a sixth mode, a base station apparatus of a radio communication system that performs transmission on a per-subframe basis, a subframe including a first slot and a second slot which are contiguous to each other in time; that uses a communication format capable of performing frequency hopping for allocating the first and second slots to different frequency bands on a per-slot basis or a per-subframe basis; and that retransmits the first subframe in a subsequent second subframe when an error is detected in a signal transmitted in the first subframe, the base station apparatus comprising: a receiving section that receives a signal transmitted from a mobile station apparatus; a frequency hopping pattern determination section that determines application of frequency hopping with regard to transmission data transmitted from the mobile station apparatus and that determines a frequency hopping pattern; a retransmission count acquisition section that acquires a number of times where the transmission data is retransmitted; an encoding ratio determination section that determines an encoding ratio of the transmission data; and a control channel signal transmission section that generates a control channel signal including frequency hopping information for instructing the frequency hopping pattern and that transmits the control channel signal to the mobile station apparatus, wherein the frequency hopping pattern determination section determines, based on the number of times where the transmission data is retransmitted and the encoding ratio, the frequency hopping pattern for performing intra-subframe frequency hopping for allocating to a single frequency band a first slot and a second slot of the first subframe to be transmitted first time when the encoding ratio of the transmission data is larger than a predetermined threshold value and allocating the first slot and the second slot to mutually-different frequency bands when the encoding ratio is equal to or smaller than the predetermined threshold value and at least either intra-subframe frequency hopping for allocating a first slot and a second slot of the second subframe to be retransmitted to mutually-different frequency bands or inter-subframe frequency hopping for allocating the first subframe and the second subframe to mutually-different frequency bands.

Intra-subframe frequency hopping is thereby not applied to the first subframe to be transmitted first time according to the encoding ratio of the transmission data when the encoding ratio is larger than the predetermined threshold value. The first slot and the second slot of the first subframe are allocated to the same frequency band, whereby a possibility of the slots being mapped to a frequency band subject to influence of frequency selective fading can be lessened. In the meantime, when the encoding ratio is equal to or smaller than the predetermined threshold value, high error correction capability is exhibited. Hence, the two slots can be prevented from being continually mapped to the frequency band subject to influence of frequency selective fading, by application of intra-subframe frequency hopping. At least either inter-subframe frequency hopping or intra-subframe frequency hopping is applied to the second subframe to be retransmitted, whereby a possibility of the respective slots being mapped to a frequency band subject to influence of frequency selective fading can be reduced. As above, a high throughput can be comprehensively acquired.

The present invention also provides, as a seventh mode, a base station unit of a radio communication system that performs transmission on a per-subframe basis, a subframe including a first slot and a second slot which are contiguous to each other in time and that uses a communication format capable of performing frequency hopping for allocating the first and second slots to different frequency bands on a per-slot basis or a per-subframe basis, the base station apparatus comprising: a receiving section that receives a signal transmitted from a mobile station apparatus; a frequency hopping pattern determination section that determines application of frequency hopping with regard to transmission data transmitted from the mobile station apparatus and that determines a frequency hopping pattern; a Doppler frequency determination section that determines a Doppler frequency of the transmission data; and a control channel signal transmission section that generates a control channel signal including frequency hopping information for instructing the frequency hopping pattern and that transmits the control channel signal to the mobile station apparatus, wherein the frequency hopping pattern determination section determines the frequency hopping pattern for performing intra-subframe frequency hopping for allocating the first slot and the second slot of the subframe to a single frequency band when the Doppler frequency of the transmission data is larger than a predetermined threshold value and allocating the first slot and the second slot of the subframe to mutually-different frequency bands when the Doppler frequency is equal to or smaller than the predetermined threshold value.

In an environment of low speed movement involving a low Doppler frequency, it thereby becomes possible to prevent two slots from being continually mapped to a frequency band subject to influence of frequency selective fading by application of intra-subframe frequency hopping. In an environment of high speed movement involving a high Doppler frequency, it thereby becomes possible to prevent occurrence of a demodulation error, which would otherwise be caused by phase fluctuations between slots in a subframe, by making application of intra-subframe frequency hopping impossible. It thereby becomes possible to enhance a possibility of a superior throughput being obtained.

The present invention also provides, as an eighth mode, the fifth or sixth base station apparatus further comprising a Doppler frequency determination section that determines a Doppler frequency of the transmission data, wherein the frequency hopping pattern determination section determines the frequency hopping pattern for performing intra-subframe frequency hopping for allocating the first slot and the second slot of the first subframe and the first slot and the second slot of the second subframe to a single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

The present invention provides, as a ninth mode, a communication control method for use with a radio communication system that performs transmission on a per-subframe basis, a subframe including a first slot and a second slot which are contiguous to each other in time; that uses a communication format capable of performing frequency hopping for allocating the first and second slots to different frequency bands on a per-slot basis or a per-subframe basis; and that retransmits the first subframe in a subsequent second subframe when an error is detected in a signal transmitted in the first subframe, the method comprising: a receiving step of receiving a signal transmitted from a mobile station apparatus to a base station apparatus; a frequency hopping pattern determination step of determining application of frequency hopping with regard to transmission data transmitted from the mobile station apparatus and determining a frequency hopping pattern; a retransmission count acquisition step of acquiring a number of times where the transmission data is retransmitted; and a control channel signal transmission step of generating a control channel signal including frequency hopping information for instructing the frequency hopping pattern and transmitting the control channel signal to the mobile station apparatus, wherein, in the frequency hopping pattern determination process, it is determined based on the number of times where the transmission data is retransmitted, the frequency hopping pattern for performing at least either intra-subframe frequency hopping for allocating to a single frequency band a first slot and a second slot of the first subframe to be transmitted first time and allocating a first slot and a second slot of the second subframe to be retransmitted to mutually-different frequency bands or inter-subframe frequency hopping for allocating the first subframe and the second subframe to mutually-different frequency bands.

The present invention also provides, as a tenth mode, a communication control method for use with a radio communication system that performs transmission on a per-subframe basis, a subframe including a first slot and a second slot which are contiguous to each other in time; that uses a communication format capable of performing frequency hopping for allocating the first and second slots to different frequency bands on a per-slot basis or the per-subframe basis; and that retransmits the first subframe in a subsequent second subframe when an error is detected in a signal transmitted in the first subframe, the method comprising: a receiving step of receiving a signal transmitted from a mobile station apparatus to a base station apparatus; a frequency hopping pattern determination step of determining application of frequency hopping with regard to transmission data transmitted from the mobile station apparatus and determining a frequency hopping pattern; a retransmission count acquisition step of acquiring a number of times where the transmission data is retransmitted; an encoding ratio determination step of determining an encoding ratio of the transmission data; and a control channel signal transmission step of generating a control channel signal including frequency hopping information for instructing the frequency hopping pattern and that transmits the control channel signal to the mobile station apparatus, wherein, in the frequency hopping pattern determination process, it is determined, based on the number of times where the transmission data is retransmitted and the encoding ratio, the frequency hopping pattern for performing intra-subframe frequency hopping for allocating to a single frequency band a first slot and a second slot of the first subframe to be transmitted first time when the encoding ratio of the transmission data is larger than a predetermined threshold value and allocating the first slot and the second slot to mutually-different frequency bands when the encoding ratio is equal to or smaller than the predetermined threshold value and at least either intra-subframe frequency hopping for allocating a first slot and a second slot of the second subframe to be retransmitted to mutually-different frequency bands or inter-subframe frequency hopping for allocating the first subframe and the second subframe to mutually-different frequency bands.

The present invention provides, as an eleventh mode, a communication control method for use with a radio communication system that performs transmission on a per-subframe basis, a subframe including a first slot and a second slot which are contiguous to each other in time and that uses a communication format capable of performing frequency hopping for allocating the first and second slots to different frequency bands on a per-slot basis or the per-subframe basis, the method comprising: a receiving step of receiving a signal transmitted from a mobile station apparatus to a base station apparatus; a frequency hopping pattern determination step of determining application of frequency hopping with regard to transmission data transmitted from the mobile station apparatus and determining a frequency hopping pattern; a Doppler frequency determination step of determining a Doppler frequency of the transmission data; and a control channel signal transmission step of generating a control channel signal including frequency hopping information for instructing the frequency hopping pattern and that transmits the control channel signal to the mobile station apparatus, wherein, in the frequency hopping pattern determination process, it is determined the frequency hopping pattern for performing intra-subframe frequency hopping for allocating the first slot and the second slot of the subframe to a single frequency band when the Doppler frequency of the transmission data is larger than a predetermined threshold value and allocating the first slot and the second slot of the subframe to mutually-different frequency bands when the Doppler frequency is equal to or smaller than the predetermined threshold value.

The present invention further provides, as a twelfth mode, the ninth or tenth communication control method further comprising a Doppler frequency determination step of determining a Doppler frequency of the transmission data, wherein, in the frequency hopping pattern determination process, it is determined the frequency hopping pattern for performing intra-subframe frequency hopping for allocating the first slot and the second slot of the first subframe and the first slot and the second slot of the second subframe to a single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

Advantage of the Invention

The present invention can provide a mobile station apparatus and a base station apparatus that can appropriately apply frequency hopping to a communication format involving a small number of minimum hopping units in one transmission unit according to various conditions and that can enhance receiving performance, as well as providing a communication control method for a radio communication system.

BRIEF DESCRIPTION OF THE DRAWINGS

FIGS. 3(a)-3(d) are views showing an example application of frequency hopping in the embodiment.

FIG. 12 It is a view showing possibilities of slots being arranged in arbitrary frequency bands fx under respective frequency hopping schemes.

FIG. 13 It is a view showing a specific example of calculation of possibilities performed in FIG. 12 when an example (N=4, x=2) shown in FIG. 4 is adopted.

DESCRIPTIONS OF THE REFERENCE NUMERALS AND SYMBOLS

Figure 1:
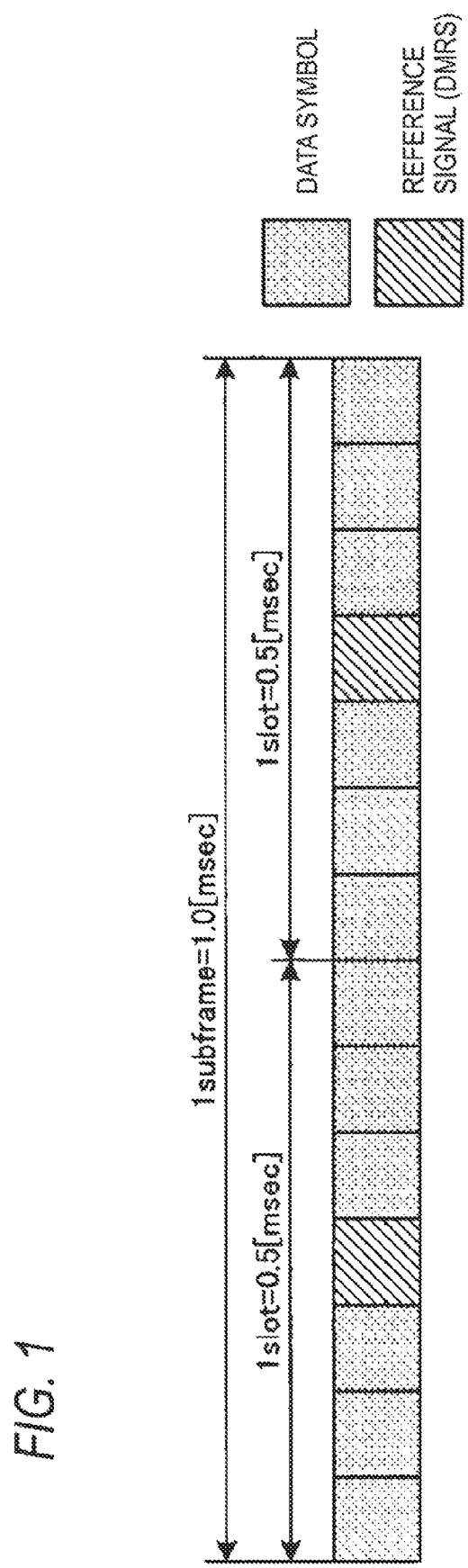
FIG. 1 It is a view showing a communication format of a radio communication system according to an embodiment of the present invention.

11 Control channel signal receiving section
12 Transmission data generation section
13 Error correction coding section
14 Transmission buffer
15 Primary modulation section
16 DFT section
17 Reference signal determination section
18 Reference signal generation section
19 Time-frequency domain mapping section
20 IFFT section
21 CP addition section
22 Time windowing section
23, 32 RF section
24, 31 Antenna
33 FFT section
34 Channel separation section
35 Channel estimation section
36 Frequency domain equalization section
37 IDFT section
38 Error correction demodulation section
39 Received data extraction section
40 Uplink channel quality measurement section
41 Scheduler
42 ACK/NACK signal generation section
43 Retransmission counter
44, 52, 62, 61 FH pattern determination section
45 Control channel signal transmission section
51 Encoding ratio comparison section
61 Doppler frequency comparison section

BEST MODES FOR IMPLEMENTING THE INVENTION

In embodiments, detailed descriptions are provided by means of taking, as examples, a mobile station apparatus and a base station apparatus used in a radio communication system for mobile communication, such as a portable phone, and an example configuration of the radio communication system. By way of an example of the radio communication system, there is provided an example application of the present invention to an uplink channel from a mobile station to a base station that is contemplated in connection with an LTE network.

An example application of frequency hopping to the embodiments and advantages of frequency hopping are now described.

FIG. 1 is a view showing a communication format of the radio communication system of an embodiment of the present invention and a frame format for the uplink channel of an LTE network. When a frame format of an uplink channel of the LTE network is viewed in a direction of a time axis, one slot (=0.5 msec.) includes seven transmission symbols. Further, one subframe (=1.0 msec.) includes two slots. Only one reference signal that is to serve as a pilot signal is arranged at the center of each slot (seven symbols), and the other transmission symbols serve as data symbols. One subframe corresponds to an encoding unit and serves as one transmission unit. In the LTE network, the transmission symbol is called a Long Block: LB, and the reference signal is called a Demodulation Reference Signal: DMRS.

Figure 2:
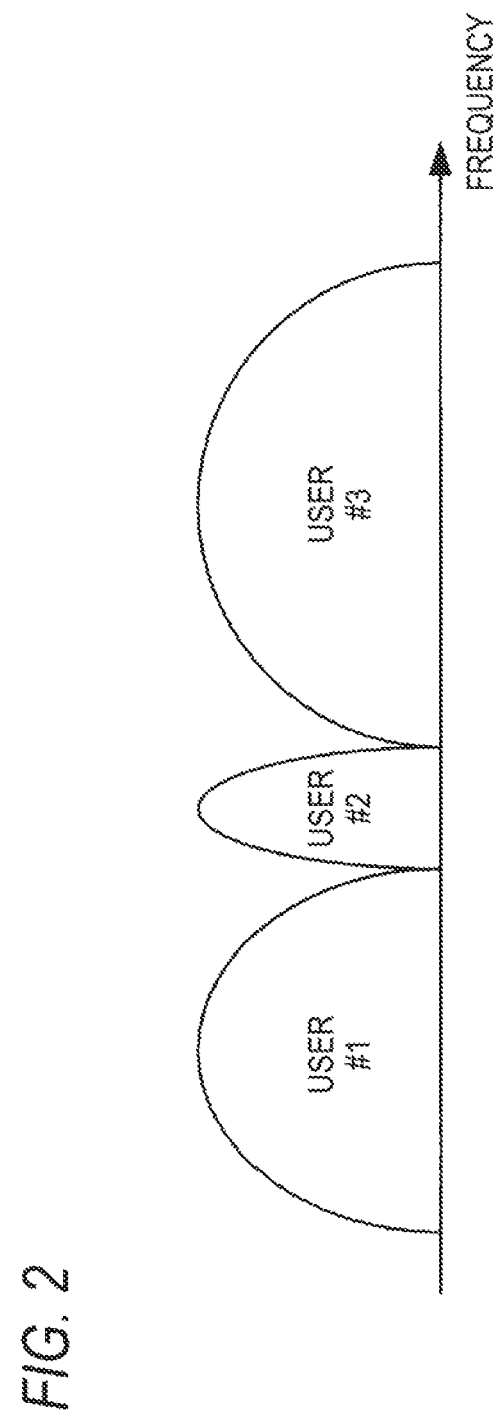
FIG. 2 It is a view showing an example layout of transmission data on a frequency axis in an uplink channel of an LTE network.

FIG. 2 is a view showing an example layout of transmission data on a frequency axis in an uplink channel of the LTE network. An SC-FDMA (Single Carrier Frequency Division Multiplexing) scheme is adopted as a modulation scheme for the uplink channel of the LTE network. Therefore, when viewed in a direction of a frequency, data transmitted through the uplink channel assume a shape resultant from sets of transmission data for respective users having undergone frequency division multiplexing, as illustrated in FIG. 2. Bandwidths assigned to the respective users can arbitrarily be changed according to required transmission rates, or the like, of the users.

Example frequency hopping applied to the present embodiment in such an uplink channel of the LTE network is provided. FIG. 3 shows several example applications of frequency hopping to the present embodiment, and FIGS. 3(a) to 3(d) show the respective applications. In FIG. 3, a horizontal axis represents a time, and a vertical axis represents a frequency.

FIG. 3(a) shows an example case where frequency hopping is not applied. In this case, a transmission signal is continually kept being mapped (assigned) to a specific frequency band ($f_2$ in an illustrated example). Specifically, a first slot and a second slot of each subframe are mapped to the same frequency band. This case is hereunder called a "No FH."

FIG. 3(b) shows an example in which frequency hopping is performed on a per-slot basis. In this case, the first slot and the second slot of each subframe are mapped to different frequency bands, respectively. In the illustrated example, the first slot is mapped to a frequency band $f_3$, and the second slot is mapped to the frequency band $f_2$. In this case, a mapping position is not changed on a per-subframe basis. As a consequence, respective slots are mapped to the frequency bands $f_3$ and $f_2$ one after the other. Frequency hopping performed on a per-subframe basis among subframes under the mapping method is hereunder called "Intra-FH" (Intra Frequency Hopping).

FIG. 3(c) is an example in which frequency hopping is performed on a per-subframe basis. In this case, the first slot and the second slot of each subframe are mapped to the same frequency band, but they are mapped to different frequency bands in the next subframe. In an illustrated example, the first and second slots are mapped to different frequency bands in sequence of $f_2$, $f_3$, $f_4$, and $f_1$ on a per-subframe basis. Frequency hopping performed between subframes under the mapping method is hereinafter called "Inter-FH" (Inter Frequency Hopping).

FIG. 3(d) shows an example combination of Inter-FH with Intra-FH. In this case, the first slot and the second slot of each subframe are mapped to different frequency bands and also mapped to different frequency bands on a per-subframe basis. In the illustrated example, the first slot of the first subframe is mapped to the frequency band $f_2$, and the second slot of the same is mapped to the frequency band $f_1$. In the second subframe, the first slot of the second subframe is mapped to the frequency band $f_3$, and the second slot of the same is mapped to the frequency band $f_2$. In the third subframe, the first slot of the third subframe is mapped to the frequency band $f_4$, and the second slot of the same is mapped to the frequency band $f_3$. Thus, the slots are sequentially mapped to different frequency bands. In this case, a mapping position is changed on a per-slot basis and a per-subframe basis. Therefore, an arrangement exhibiting the highest random characteristic is accomplished. Frequency hopping performed on a per-slot basis and a per-subframe basis that is a combination of the intra frequency hopping and the inter frequency hopping performed under the mapping method is hereinafter called "Inter/Intra-FH" (Inter and Intra Frequency Hopping).

Effectiveness of frequency hopping performed in the uplink channel of the LTE network is now discussed. In relation to the frame format of the uplink channel of the LTE, such as that mentioned above, conceivable conditions under which an advantage of frequency hopping changes according to an environment include (1) a difference in receiving performance attributable to an encoding ratio, (2) occurrence/nonoccurrence of retransmission (the number of retransmission operations), (3) traveling speed of a mobile station, and the like.

(1) Encoding Ratio

Figures 4, 5:
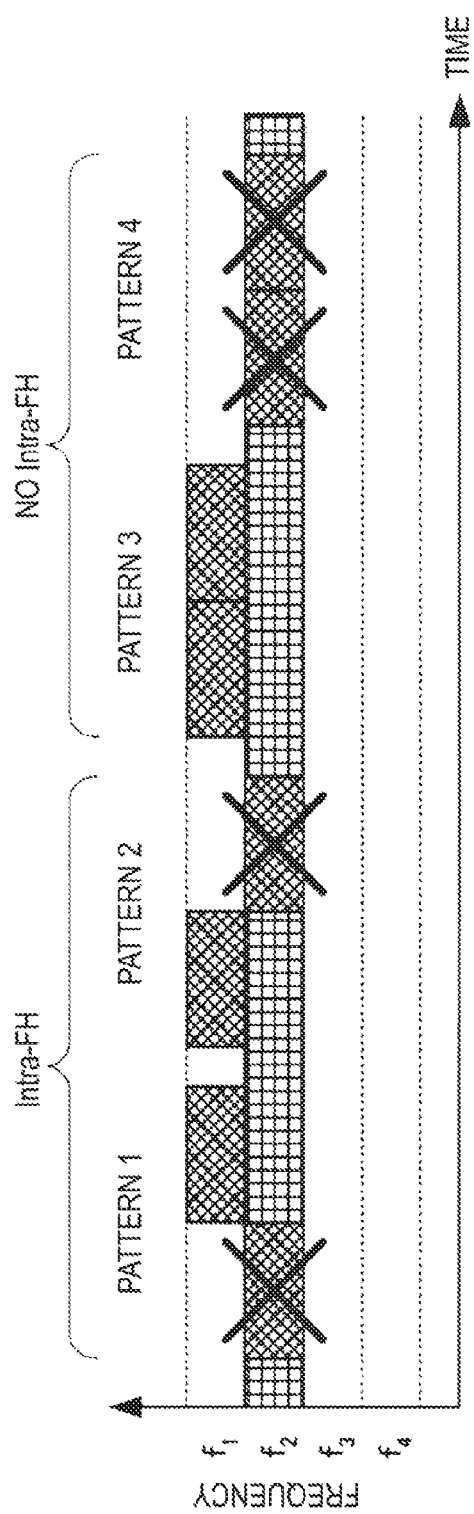
FIG. 4 It is a view showing an example application of frequency hopping achieved when a frequency band $f_2$ undergoes influence of frequency selective fading.
FIG. 5 It is a view showing receiving performance achieved at respective encoding ratios in the embodiment shown in FIG. 4.

FIG. 4 is a view showing an example application of frequency hopping to a case where the frequency band $f_2$ undergoes influence of frequency selective fading. For the sake of brevity, when respective slots are assumed to be mapped solely to the frequency bands $f_1$ and $f_2$, four patterns shown in FIG. 4 are conceivable as mapping patterns. Of these mapping patterns, patterns 1 and 2 can be deemed as patterns subjected to Intra-FH, and patterns 3 and 4 can be deemed as patterns not subjected to Intra-FH.

FIG. 5 shows receiving performance achieved at the respective encoding ratios in the example shown in FIG. 4. In the patterns 1 and 2, one-half slots of one subframe are under a deteriorated receiving environment under influence of frequency selective fading. In such a state, when an encoding ratio R is high (e.g., R=¾, or the like), error correction becomes difficult, and demodulation cannot be performed. On the contrary, when the encoding ratio is low (e.g., R=⅓, or the like), error correction capability is high, and hence demodulation becomes feasible though not in much the same way as in the case of a pattern 3.

In the pattern 3, both slots of the pattern are in a good receiving environment, and hence demodulation of received signals becomes feasible without regard to an encoding ratio. In the meantime, both slots of a pattern 4 are in a poor receiving environment, and hence demodulation of received signals becomes difficult without regard to an encoding ratio.

From above, the followings can be found on effectiveness of frequency hopping determined by an encoding ratio.

When an encoding ratio is low, it is better to perform Intra-FH in order to avoid occurrence of such a situation as described in connection with the pattern 4.

When the encoding ratio is high, error correction capability is low.

Therefore, a received signal cannot be demodulated by means of the pattern 1 or the pattern 2. When Intra-FH is performed, a probability of any of the slots being mapped to the frequency band $f_2$ becomes high. Therefore, it is better not to perform Intra-FH.

(2) Retransmission

Figure 6:
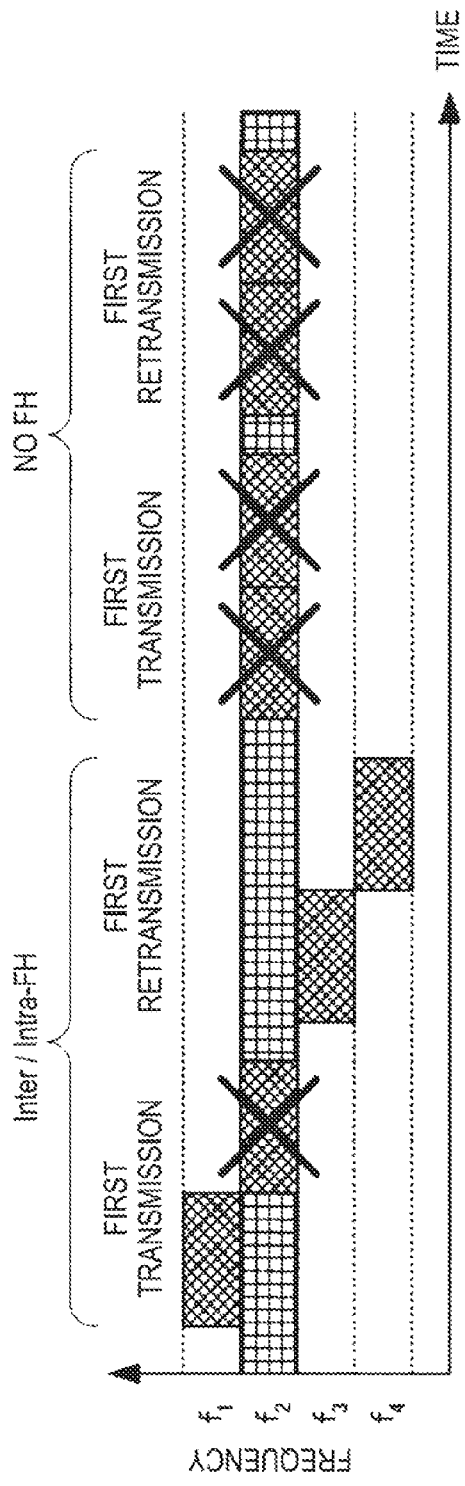
FIG. 6 It is a view showing an example application of frequency hopping to retransmission.

FIG. 6 is a view showing an example application of frequency hopping during retransmission and showing a case of Inter/Intra-FH and no FH. In relation to conditions for a receiving environment, the frequency band $f_2$ is assumed to undergo influence of frequency selective fading as described in connection with (1).

First, when Inter/Intra-FH is applied, the second slot is mapped to the frequency band $f_2$ at the time of first transmission. However, a retransmission symbol for first retransmission is mapped while avoiding the frequency band $f_2$. The LTE network adopts a chase combination (Chase Combining) scheme and an IR (Incremental Redundancy) scheme as retransmission control. Therefore, high error correction capability can be obtained by combining a first transmission symbol with a retransmission symbol on the receiving side. In this case, of a total of four slots belonging to the first transmission and one retransmission, only one slot is mapped to the frequency band $f_2$, so that the receiving side can demodulate the received signal.

In the meantime, when no FH is performed, at worst the slot is kept being mapped to the frequency band $f_2$ at all times as shown in FIG. 6. For this reason, a retransmission gain is not acquired, and difficulty is encountered in demodulating the received signal despite chase combination processing and IR processing.

From the above, the followings can be said of the effectiveness of frequency hopping exhibited during retransmission.

When Inter/Intra-FH is applied, a retransmission symbol is mapped to a frequency band differing from that two which the slot was mapped in during first transmission. Therefore, a high retransmission gain is obtained by means of a frequency interleaving effect.

When no FH is performed, at worst the slot is kept being mapped to a frequency band of poor receiving state at all times, and hence difficulty is encountered in acquiring a retransmission gain.

(3) Traveling Speed

When a mobile station moves at high speed, a Doppler frequency arises, whereupon a great phase rotation arises in one subframe. For the sake of simplicity, a consideration is given to a case where a base station is installed in an extension of a traveling direction of the mobile station. Provided that traveling speed of the mobile station is "v" [m/sec]; light speed is "c" [m/sec.]; and a carrier frequency of a transmission signal is $f_c$ [Hz], the Doppler frequency $f_{d,v}$ is expressed by Mathematical Expression 1 provided blow.

[Mathematical Expression 1]

$$f_{d,v} = \frac{v f_c}{c} \text{ [Hz]} \quad \text{(Expression 1)}$$

In a mobile communication system, the mobile station is given an AFC (Automatic Frequency Control) function. Therefore, in reality, the mobile station adds a frequency offset corresponding to the Doppler frequency $f_{d,v}$ to the oscillator despite no frequency error in the oscillator of the base station and the oscillator of the mobile station. Moreover, the mobile station transmits an uplink signal by use of the oscillator additionally given the frequency offset corresponding to $f_{d,v}$. As a matter of course, another Doppler frequency $f_{d,v}$ occurs in an uplink propagation path. Therefore, the uplink signal received by the base station is additionally given two Doppler frequencies $f_{d,v}$. For the sake of simplicity, the uplink channel and a downlink channel are considered to have the same carrier frequency.

By way of example, provided that the traveling speed of the mobile station is 3 [km/h]; the carrier frequency is 2 [GHz]; and that light speed is $3 \times 10^8$ [m/sec.], a Doppler frequency $f_{db,3}$ added to a signal received by the base station is determined by Mathematical Expression 2 provided below.

[Mathematical Expression 2]

$$\begin{aligned}f_{db,3} &= 2 f_{d,3} \\ &= \frac{2 \times 3 \times 10^3 / 3600 \times 2 \times 10^9}{3 \times 10^8} \\ &= 11 \text{ [Hz]}\end{aligned} \quad \text{(Expression 2)}$$

In this case, a phase rotation $\theta_3$ expressed by Mathematical Expression 3 occurs at both ends of one subframe.

[Mathematical Expression 3]

$$\theta_3 = 360 f_{db,3} T_s = 360 \times 11 \times 1 \times 10^{-3} = 4 \text{ [deg]} \quad \text{(Expression 3)}$$

Likewise, when the traveling speed is 120 [km/h], a Doppler frequency $f_{db,120}$ and a phase rotation $\theta_{120}$ are determined by Mathematical Expression 4 and Mathematical Expression 5 provided below.

[Mathematical Expression 4]

$$\begin{aligned}f_{db,120} &= 2 f_{d,120} \\ &= \frac{2 \times 120 \times 10^3 / 3600 \times 2 \times 10^9}{3 \times 10^8} \\ &= 444 \text{ [Hz]}\end{aligned} \quad \text{(Expression 4)}$$

[Mathematical Expression 5]

$$\begin{aligned}\theta_{120} &= 360 f_{db,120} T_s \\ &= 360 \times 444 \times 1 \times 10^{-3} \\ &= 160 \text{ [deg]}\end{aligned} \quad \text{(Expression 5)}$$

When traveling speed is 3 [km/h], a phase rotation of only 4 [deg] arises in one subframe. Therefore, particular processing is not required. However, in the case of the traveling speed of 120 [km/h], a phase rotation of 160 [deg] arises. Therefore, the receiving side (the base station) must make a correction to the phase rotation. A technique mentioned as phase correction means is to determine estimated channel values from two reference signals in one subframe by means of the frame format shown in FIG. 1 and subject the respective estimated channel values to linear interpolation. The technique is based on condition that two reference signals are mapped to the same frequency band. Put another way, when the mobile station is moving at high speed, two slots must be mapped to the same frequency band without performance of Intra-FH.

From the above, the followings can be said of the effectiveness of frequency hopping regarding traveling speed.

In an environment of low speed movement, phase fluctuations caused by a Doppler frequency are negligible, and hence Intra-FH is applicable.

In an environment of high speed movement, great phase fluctuations arise in one subframe; therefore, the phase fluctuations must be determined from two reference signals. Specifically, application of Intra-FH becomes impossible.

In the embodiments, it is determined, from the above considerations about the effectiveness of frequency hopping, whether or not frequency hopping is applicable according to various conditions.

First Embodiment

Figure 7:
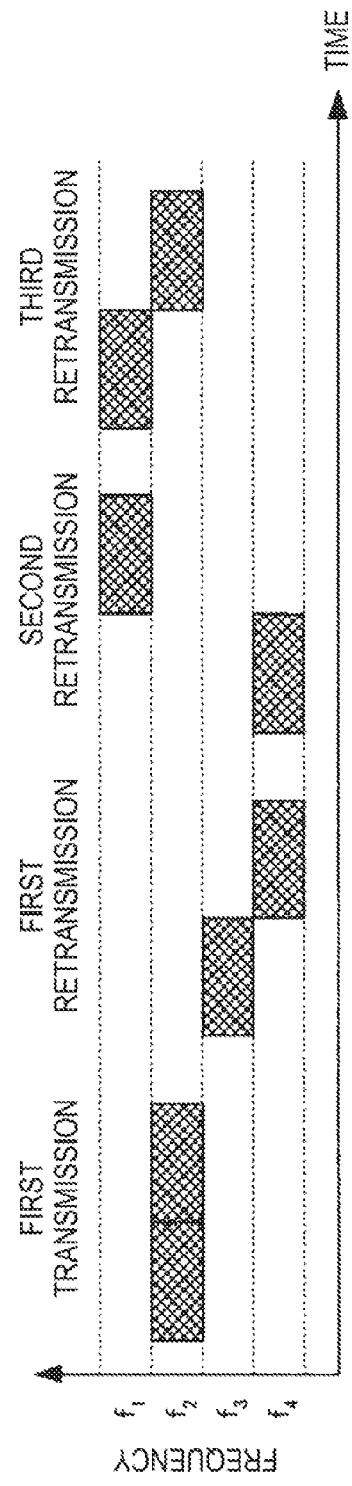
FIG. 7 It is a view showing example application of frequency hopping in the first embodiment.

FIG. 7 is a view showing an example application of frequency hopping in a first embodiment. There is illustrated an example mapping pattern pertaining to respective slots and subframes appearing at respective transmission operations.

In the first embodiment, application of frequency hopping is changed according to occurrence or nonoccurrence of retransmission. Specifically, Intra-FH is not applied to the first transmission operation, and transmission data pertaining to two slots are mapped to the same frequency band. Inter/Intra-FH is applied solely to a retransmission symbol for retransmission operation (first retransmission operation and subsequent retransmission operations). Transmission data are mapped to different frequency bands on a per-slot basis. A throughput characteristic is thereby improved. An effect of frequency hopping yielded in the first embodiment is described in detail later.

Figure 8:
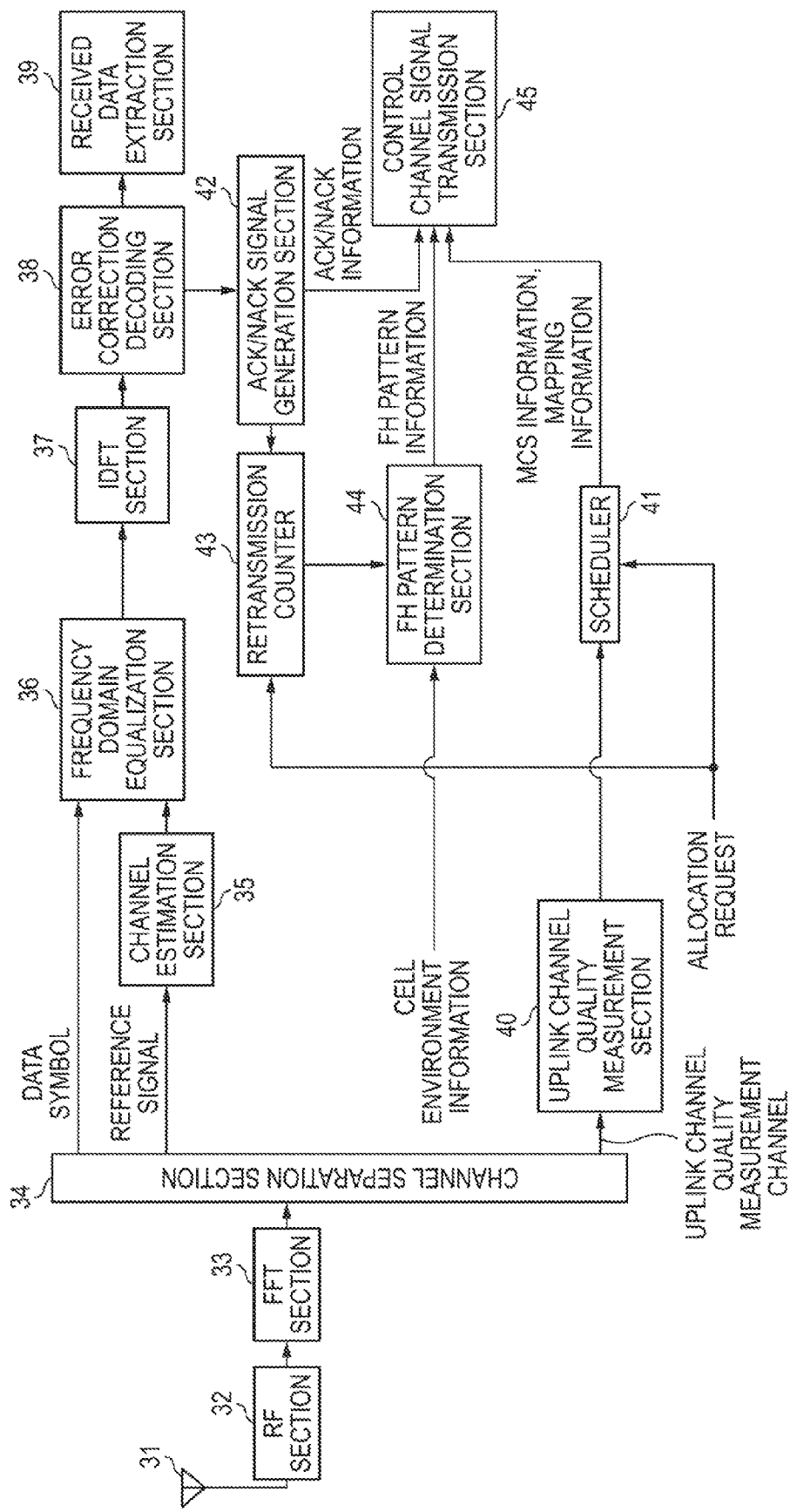
FIG. 8 It is a block diagram showing a configuration of a receiving section of a base station apparatus of the first embodiment.

Configuration operation of the radio communication system of the first embodiment is now described. First, a receiver of the base station apparatus is described. FIG. 8 is a block diagram showing a configuration of a receiving section of the base station apparatus of the first embodiment.

The receiving section of the base station apparatus includes an antenna 31, an RF section 32, an FFT section 33, a channel separation section 34, a channel estimation section 35, a frequency domain equalization section 36, an IDFT section 37, an error correction decoding section 38, a received data extraction section 39, an uplink channel quality measurement section 40, a scheduler 41, an ACK/NACK signal generation section 42, a retransmission counter 43, an FH pattern determination section 44, and a control channel signal transmission section 45.

The RF section 32 implements a function of a receiving section that receives a signal transmitted from the mobile station apparatus. The retransmission counter 43 implements a function of a retransmission count acquisition section that acquires the number of times transmission data are retransmitted. The FH pattern determination section 44 implements a function of a frequency hopping pattern determination section that determines an application of frequency hopping pertaining to transmission data transmitted from the mobile station apparatus, thereby determining a frequency hopping pattern. The control channel signal transmission section 45 implements a function of a control channel signal transmission section that generates a control channel signal including frequency hopping information for instructing the frequency hopping pattern and that transmits the control channel signal to the mobile station apparatus.

First, after the RF section 32 has converted a high frequency signal received by way of the antenna 31 into a baseband signal, the FFT section 33 converts a time domain signal into a frequency domain signal by means of fast Fourier transform (FFT). Next, the channel separation section 34 classifies the received signal into three categories; namely, a data symbol, a reference signal, and an uplink channel quality measurement channel. The data symbol is herein called also a Physical Uplink Shared Channel: PUSCH, and the uplink channel quality measurement channel is called also a Sounding RS. The uplink channel quality measurement channel is periodically transmitted from the base station to the mobile station.

Of these signals, the data symbol is input directly into the frequency domain equalization section 36. The channel estimation section 35 subjects the reference signal to correlation operation along with a reference signal previously prepared by the receiving side, thereby determining an estimated channel value. The thus-estimated channel value is input to the frequency domain equalization section 36. The frequency domain equalization section 36 subjects the data symbol to correction processing according to information about amplitude and phase fluctuations acquired from the estimated channel value. Subsequently, the IDFT section 37 converts the data symbol into a time domain signal by means of inverse discrete Fourier transform (IDFT), and the error correction decoding section 38 performs error correction decoding processing. The received data extraction section 39 acquires a desired received data sequence.

In relation to the uplink channel quality measurement channel, the uplink channel quality measurement section 40 measures receiving quality represented by a CQI (Channel Quality Indicator), or the like, and a Doppler frequency $f_d$ for each resource block (Resource Block: RB) that is a unit for a plurality of divided frequency domains and reports measurement results to the scheduler 41. The measurement results pertaining to uplink channel quality are stored in the form of a receiving quality table, or the like. Though not illustrated, a Downlink CQI reported from the mobile station by way of the PUCCH (Physical Uplink Control Channel) can also be used as receiving quality in lieu of the CQI measured by use of the uplink channel quality measurement channel. The scheduler 41 determines a modulation scheme (MCS: Modulation and Coding Scheme) and mapping information (Resource Allocation) from information about the receiving quality and the Doppler frequency and allocation request information designated by an unillustrated high-level layer.

The ACK/NACK signal generation section 42 generates an ACK (Acknowledgement) signal or a NACK (Negative Acknowledgement) signal as a response signal in answer to a result of error correction made by the error correction decoding section 38. When the data symbol subjected to error correction can have been properly decoded, an ACK signal is generated. On the contrary, when the data symbol cannot have been properly decoded, a NACK signal is generated. According to the ACK/NACK information about the data symbol, the retransmission counter 43 counts the number of times an uplink signal is retransmitted. Specifically, in the case of the ACK signal, a data symbol of the next subframe becomes first transmission, and hence a count value of the retransmission counter is reset to zero. In the meantime, in the case of the NACK signal, a data symbol of the next subframe becomes a retransmission symbol, and therefore the count value of the retransmission counter is incremented by one. According to the allocation request information designated by the unillustrated high-level layer, the retransmission counter 43 outputs the count value to the FH pattern determination section 44.

Concurrently with determination of the modulation scheme and the mapping information performed by the scheduler 41, the FH pattern determination section 44 determines an FH pattern showing a mapping pattern of frequency hopping. On this occasion, the FH pattern determination section 44 determines an FH pattern according to cell environment information previously, uniquely allocated to a base station and the count value of the retransmission counter 43, thereby generating FH pattern information. When the retransmission counter 43 indicates zero, the FH pattern determination section 44 determines not to perform Intra-FH. FH pattern information serving as frequency hopping information for instructing non-performance of Intra-FH is reported to the mobile station (FH Pattern=0 is now selected). When the retransmission counter 43 is not zero, an FH pattern is determined from the cell environment information in order to perform Inter/Intra-FH. The FH pattern information serving as the frequency hopping information for instructing Inter/Intra-FH frequency hopping is reported to the mobile station.

The control channel signal transmission section 45 generates and modulates a downlink control channel signal including the modulation scheme information (the MCS information), the mapping information, the ACK/NACK information, and the FH pattern information. The downlink control channel signal is transmitted and reported to the mobile station apparatus of a communication party on the other end by way of an unillustrated transmission RF section. The downlink control channel signal is called also a Physical Downlink Control Channel: PDCCH, signal.

Figure 9:
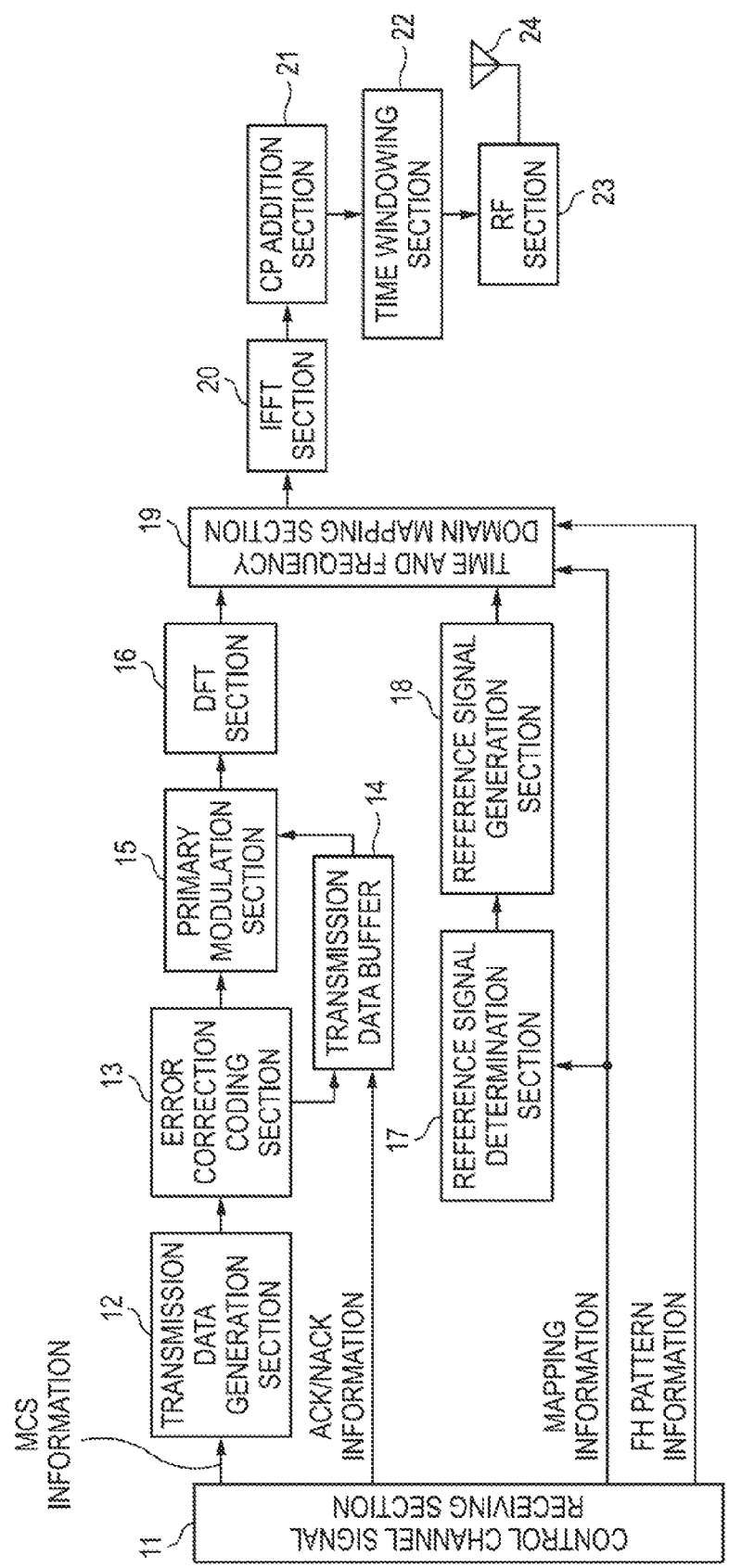
FIG. 9 It is a block diagram showing a configuration of a transmission section of a mobile station apparatus of the first embodiment.

Subsequently, a transmitter of the mobile station apparatus is described. FIG. 9 is a block diagram showing a configuration of a transmission section of the mobile station apparatus of the first embodiment.

The transmission section of the mobile station apparatus includes a control channel signal receiving section 11, a transmission data generation section 12, an error correction coding section 13, a transmission data buffer 14, a primary modulation section 15, a DFT section 16, a reference signal determination section 17, a reference signal generation section 18, a time and frequency domain mapping section 19, an IFFT section 20, a CP addition section 21, a time windowing section 22, an RF section 23, and an antenna section 24.

The control channel signal receiving section 11 implements a function of a control channel signal receiving section that receives the control channel signal reported by the base station apparatus. The time and frequency domain mapping section 19 implements a function of a frequency band mapping section that performs mapping of transmission data to a frequency band according to frequency hopping information included in the control channel signal. The RF section 23, or the like, implements a function of a transmission section that transmits the mapped transmission data to the base station apparatus.

First, the control channel signal receiving section 11 receives a downlink control channel signal from the base station apparatus by way of an unillustrated receiving RF section and demodulates the thus-received downlink control channel signal. The MCS information in the downlink control channel signal is input to the transmission data generation section 12, and the ACK/NACK information is input to the transmission data generation section 12 and the transmission data buffer 14. The mapping information is input to the reference signal determination section 17 and the time and frequency domain mapping section 19, and the FH pattern information is input to the time and frequency domain mapping section 19.

The transmission data generation section 12 generates transmission data for an uplink transmission signal from the MCS information. The error correction coding section 13 performs error correction coding operation at an encoding ratio commensurate with the MCS. After the primary modulation section 15 has performed primary modulation processing (QPSK, or the like) according to a degree of modulation commensurate with the MCS, the DFT section 16 converts a time domain modulation signal into a frequency domain signal by means of discrete Fourier transform (DFT) and input the thus-converted signal into the time and frequency domain mapping section 19. The coded data subjected to error correction coding processing performed by the error correction coding section 13 are also output to and retained in the transmission data buffer 14. When the NACK signal is input, the transmission data buffer 14 outputs a retransmission symbol for retransmission purpose to the primary modulation section 15 according the ACK/NACK information.

In parallel with processing of the transmission data, the reference signal determination section 17 determines a sequence length and specifics of the reference signal (DMRS) from the mapping information. The reference signal generation section 18 generates a DMRS sequence that is a data sequence showing a reference signal and subsequently input the DMRS sequence to the time and frequency domain mapping section 19.

The time and frequency domain mapping section 19 then maps a data symbol of the transmission signal and a reference signal according to a mapping pattern designated by the FH pattern information. The IFFT section 20 subsequently converts a transmission symbol into a time domain signal by means of Inverse Fast Fourier Transform (IFFT) on a per-transmission-symbol basis. The CP addition section 21 adds a CP (Cyclic Prefix) to the time domain signal, and the time windowing section 22 subjects the signal to time windowing. The RF section 23 converts a baseband signal into a high frequency signal and then transmits the high frequency transmission signal to the base station apparatus of the communication party on the other end by means of the antenna 24.

Figure 10:
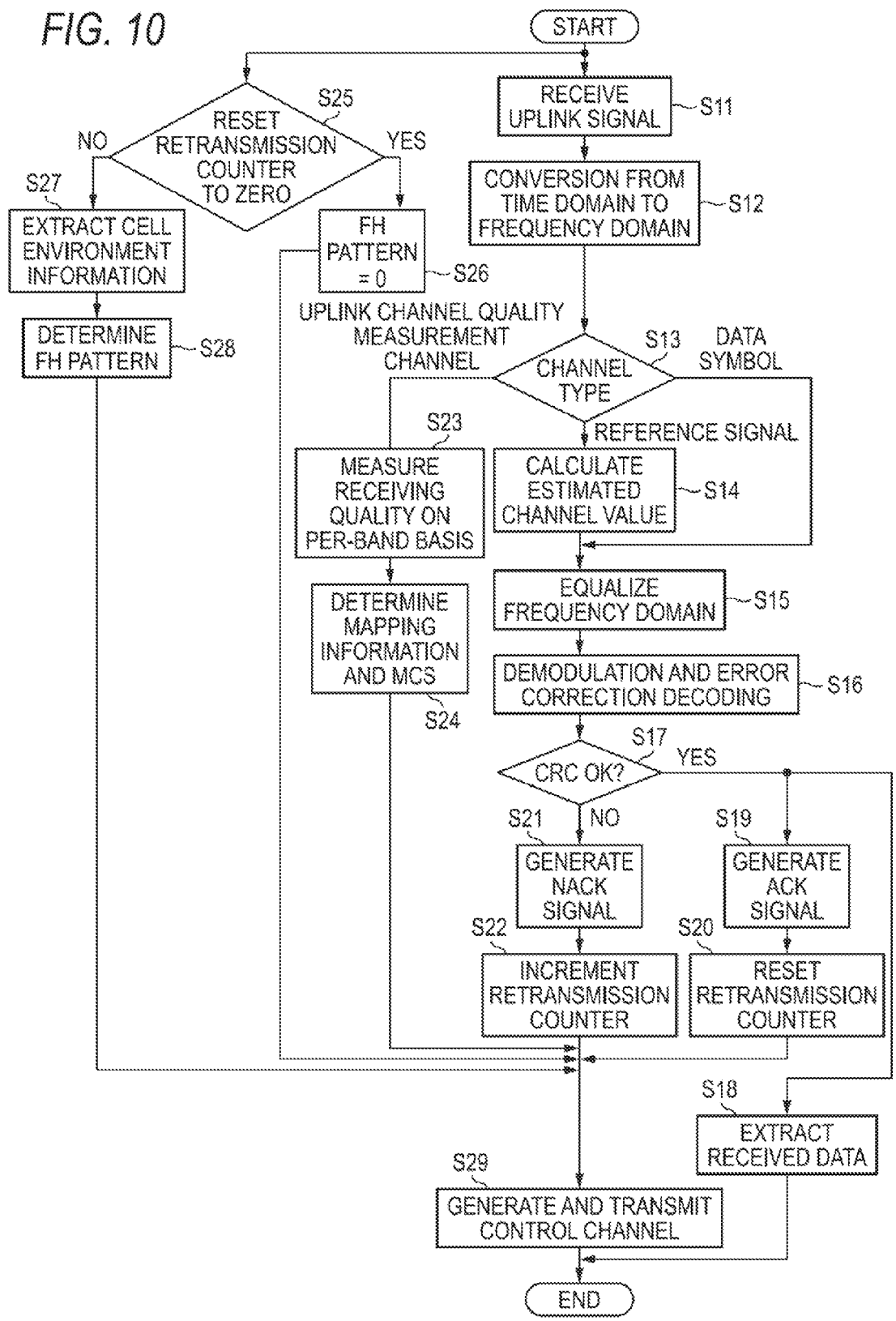
FIG. 10 It is a flowchart showing processing procedures of the receiving section of the base station apparatus of the first embodiment.
Figure 11:
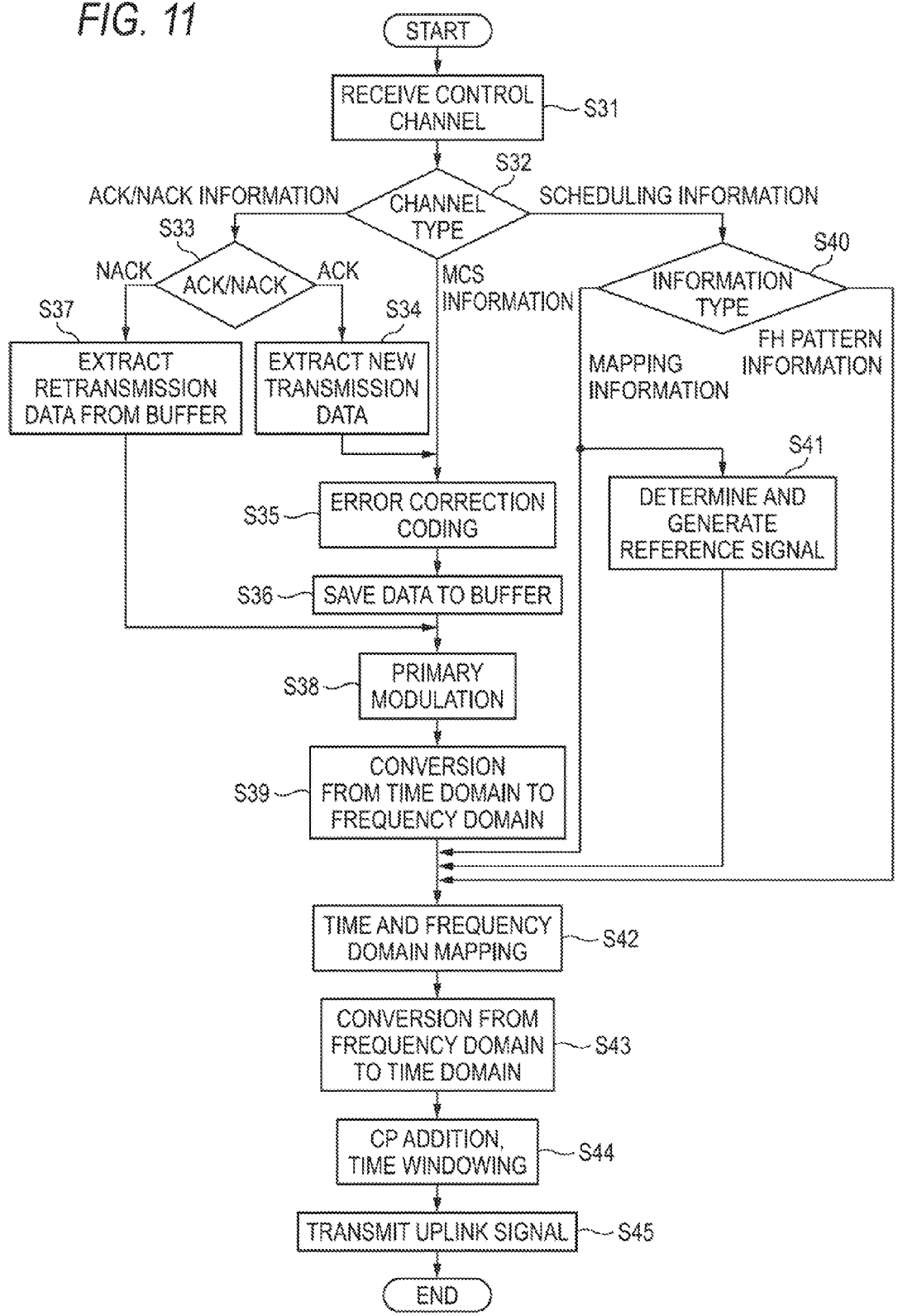
FIG. 11 It is a flowchart showing processing procedures of the transmission section of the mobile station apparatus of the first embodiment.

Operation of the radio communication unit of the first embodiment is now described along procedures. FIG. 10 is a flowchart showing processing procedures of the receiving section of the base station apparatus of the first embodiment, and FIG. 11 is a flowchart showing processing procedures of the transmission section of the mobile station apparatus of the first embodiment.

The base station apparatus first subjects an uplink signal from the mobile station apparatus to receiving processing by means of the antenna 31 and the RF section 32 (step S11), and the FFT section 33 converts the time domain signal into a frequency domain signal (step S12). The channel separation section 34 separates the received signal into three categories; namely, a data symbol, a reference signal, and an uplink channel quality measurement channel, and determines a channel type (step S13).

In connection with the reference signal (DMRS), the channel estimation section 35 calculates an estimated channel value (step S14), and the frequency domain equalization section 36 performs frequency domain equalization processing (step S15). Processing proceeds to step S15, where the frequency domain equalization section 36 subjects the data symbol (PUSCH) described in connection with step S13 to frequency domain equalization processing. Subsequently, the IDFT section 37 and he error correction decoding section 38 performs demodulation processing and error correction decoding processing (step S16), thereby determining whether a result of CRC inspection of decoded data is normal (OK/NG) (step S17).

When the decoding result is determined to be normal in step S17, the received data sequence decoded by the received data extraction section 39 are extracted (step S18). The ACK/NACK signal generation section 42 generates an ACK signal as ACK/NACK information along with the thus-extracted received data sequence (step S19). A count value of the retransmission counter 43 is reset to zero (step S20). In the meantime, when the decoding result is determined to be anomalous in step S17, the ACK/NACK signal generation section 42 generates a NACK signal as the ACK/NACK information (step S21) and increments a count value of the retransmission counter 43 by one (step S22).

In relation to the uplink channel quality measurement channel (Sounding RS) described in connection with step S13, the uplink channel quality measurement section 40 measures receiving quality for each uplink channel frequency band (step S23), and the scheduler 41 determines an MCS and the mapping information from the receiving quality (step S24).

Concurrently with processing, the FH pattern determination section 44 determines whether or not the count value of the retransmission counter 43 is zero (step S25). When the count value of the retransmission counter 43 is zero; namely, when the current transmission is first transmission, a determination meaning that Intra-FH is not performed is rendered. FH Pattern=0 is set as a value of the FH pattern (step S26). Meanwhile, when the count value of the retransmission counter 43 is determined not to be zero in step S25; namely, when the current transmission is retransmission, a determination meaning that Inter/Intra-FH is performed is rendered, and cell environment information is extracted (step S27). An FH pattern is determined according to the cell environment information (step S28).

The control channel signal transmission section 45 generates the downlink control channel signal including the thus-generated MCS information, the mapping information, the ACK/NACK information, and the FH pattern information; modulates the thus-generated downlink control channel signal; and transmits and reports the downlink control channel signal to the mobile station apparatus (step S29). The mapping information and the FH pattern information are also called scheduling information.

Meanwhile, the mobile station apparatus first receives a downlink control channel signal from the base station apparatus by means of the control channel signal receiving section 11 and demodulates the thus-received downlink control channel (step S31). ACK/NACK information, MCS information, and scheduling information are respectively extracted from the demodulated signal, thereby determining a channel type (step S32). Since MCS information is used in error correction coding processing performed in step S35 and primary modulation processing performed in step S37, both of which will be described later, the MCS information is output to the error correction coding section 13 and the primary modulation section 15 by way of the transmission data generation section 12.

In step S32, a determination is made as to whether or not the ACK/NACK information is an ACK signal or a NACK signal (step S33). When the ACK signal is received, new transmission data are extracted from the transmission data generation section 12 (step S34). The error correction coding section 13 subjects the thus-extracted transmission data to error correction coding processing according to an encoding ratio of the MCS (step S35). The coded data are saved in the transmission data buffer 14 (step S36) and output to the primary modulation section 15. Meanwhile, when the NACK signal is received, retransmission data are extracted from the transmission data buffer 14 (step S37) and output to the primary modulation section 15. According to a degree of modulation in the MCS, the primary modulation section 15 subjects the retransmission data to primary modulation processing (step S38). The thus-modulated data are converted from a frequency domain into a time domain by the DFT section 16 (step S39), and the thus-converted time domain data are output to the time and frequency domain mapping section 19.

In step S32, a determination is further made as to whether the scheduling information is mapping information or the FH pattern information, thereby determining an information type (step S40). The mapping information is used in time and frequency domain mapping processing pertaining to step S42, which will be described later. Hence, the mapping information is output to the time and frequency domain mapping section 19 and also to the reference signal determination section 17. The reference signal determination section 17 determines a sequence length and specifics of the reference signal from the mapping information, and the reference signal generation section 18 generates a reference signal (step S41).

The thus-generated reference signal is output to the time and frequency domain mapping section 19. Further, the FH pattern information is output to the time and frequency domain mapping section 19 in step S40.

The time and frequency domain mapping section 19 then maps the data symbol of the transmission signal and the reference signal according to the mapping information and the FH pattern information (step S42). The IFFT section 20 converts the signal from the frequency domain into the time domain on a per-transmission symbol (step S43). The CP addition section 21 adds a CP to the signal, and the time windowing section 22 subjects the signal to time windowing (step S44). An uplink transmission signal is transmitted to the base station apparatus from the RF section 23 and the antenna 24 (step S45).

Results of calculation of possibilities of respective effects resultant from frequency hopping using application standards of the first embodiment are now provided below.

FIG. 12 is a view showing possibilities of slots being arranged in arbitrary frequency bands $f_x$ under the respective frequency hopping schemes. FIG. 12 shows that possibilities of slots being mapped to the frequency band $f_x$ when two slots transmitted at the time of the first transmission, a total of four slots transmitted at the time of first retransmission (the second transmission), and a total of six slots transmitted at the time of the second retransmission (the third transmission) are subjected to no FH, Intra-FH, Inter-FH, Inter/Intra-FH, and the frequency hopping operation schemes described in connection with the first embodiment are provided in the form of expressions. The number of frequency bands is taken as N; a frequency band among the N frequency bands subjected to influence of frequency selective fading is taken as $f_x$; and the number of slots mapped to the frequency band $f_x$ is taken as $n_x$.

FIG. 13 is a view specifically showing the respective probabilities achieved in FIG. 12 when the example (N=4, x=2) shown in FIG. 4 is adopted. Slot mapping is assumed to be randomly selected in FIGS. 12 and 13.

Results shown in FIG. 13 show, as frequency hopping results, the followings.

In relation to the first transmission, a low possibility of selection of a frequency band $f_2$ subjected to the influence of frequency selective fading is achieved when Intra-FH is not performed (no FH, Inter-FH, and the application of frequency hopping described in connection with the first embodiment). Specifically, a possibility of occurrence of $n_2=0$ is high. In reality, when Intra-FH is not performed, two reference signals are mapped to the same band. Therefore, a degree of accuracy of channel estimation is enhanced. Higher receiving performance is exhibited even in the same case where $n_x=0$ is achieved. Since receiving performance of the first transmission greatly affects a throughput, a high throughput can be expected especially in an environment where a signal-to-noise power ratio (SNR) is high.

In the first retransmission, a high possibility of occurrence of $n_2=0$ or 1 is achieved at the time of no FH, Inter/Intra-FH, and the application of frequency hopping described in connection with the first embodiment. Since a total of four slots are transmitted by means of retransmission, high receiving performance is exhibited as a result of the receiving side performing retransmission combination processing, like chase combination processing and IR processing, even when $n_2=1$ is achieved.

Even at the time of the second retransmission, a high possibility of occurrence of $n_2 \leq 2$ is likewise achieved at the time of no FH, Inter/Intra-FH, and the application of frequency hopping described in connection with the first embodiment. However, a high possibility of occurrence of $n_2=6$ is also acquired at the time of no FH, and hence receiving performance cannot necessarily be said to be superior. As a consequence, in an environment where a low SNR is achieved and where retransmission is likely to arise, a superior throughput can be expected when the Inter/Intra-FH and the frequency hopping schemes described in connection with the first embodiment are applied.

From the above descriptions, it is understood that the possibility of the respective slots of the data symbol being mapped to the frequency band subject to the influence of the frequency selective fading can be reduced by the frequency hopping application scheme described in connection with the first embodiment, so that a totally high throughput can be yielded.

Second Embodiment

In a second embodiment, application of frequency hopping is changed according to an encoding ratio. Specifically, when the encoding ratio is equal to a predetermined value or less during first transmission, Intra-FH is carried out. When the encoding ratio is larger than the predetermined value, Intra-FH is not carried out. A throughput characteristic can thereby be improved.

In the first embodiment, Intra-FH is not carried out at the time of first transmission. However, so long as the encoding ratio of the data symbol is low, a received slot can be demodulated even when $n_x=1$ is achieved at first transmission shown in FIG. 12. Specifically, when the encoding ratio is low, high error correction capability is exhibited. Hence, even when one of the two slots is mapped to a frequency band subject to the influence of the frequency selective fading, the slot can be demodulated by error correction processing. Conversely, in order to avoid occurrence of a state of $n_x=2$ where both of the two slots are mapped to a frequency band subject to the influence of the frequency selective fading (i.e., in order to reduce the possibility of occurrence of $n_x=2$), it is better to carry out Intra-FH from the first transmission.

Configuration operation of the radio communication unit of the second embodiment is now described. Only operation of a receiver in the base station apparatus is now described. A transmitter of the mobile station apparatus is the same as that described in connection with the first embodiment by reference to FIGS. 9 and 11, and hence its repeated explanation is omitted.

Figure 14:
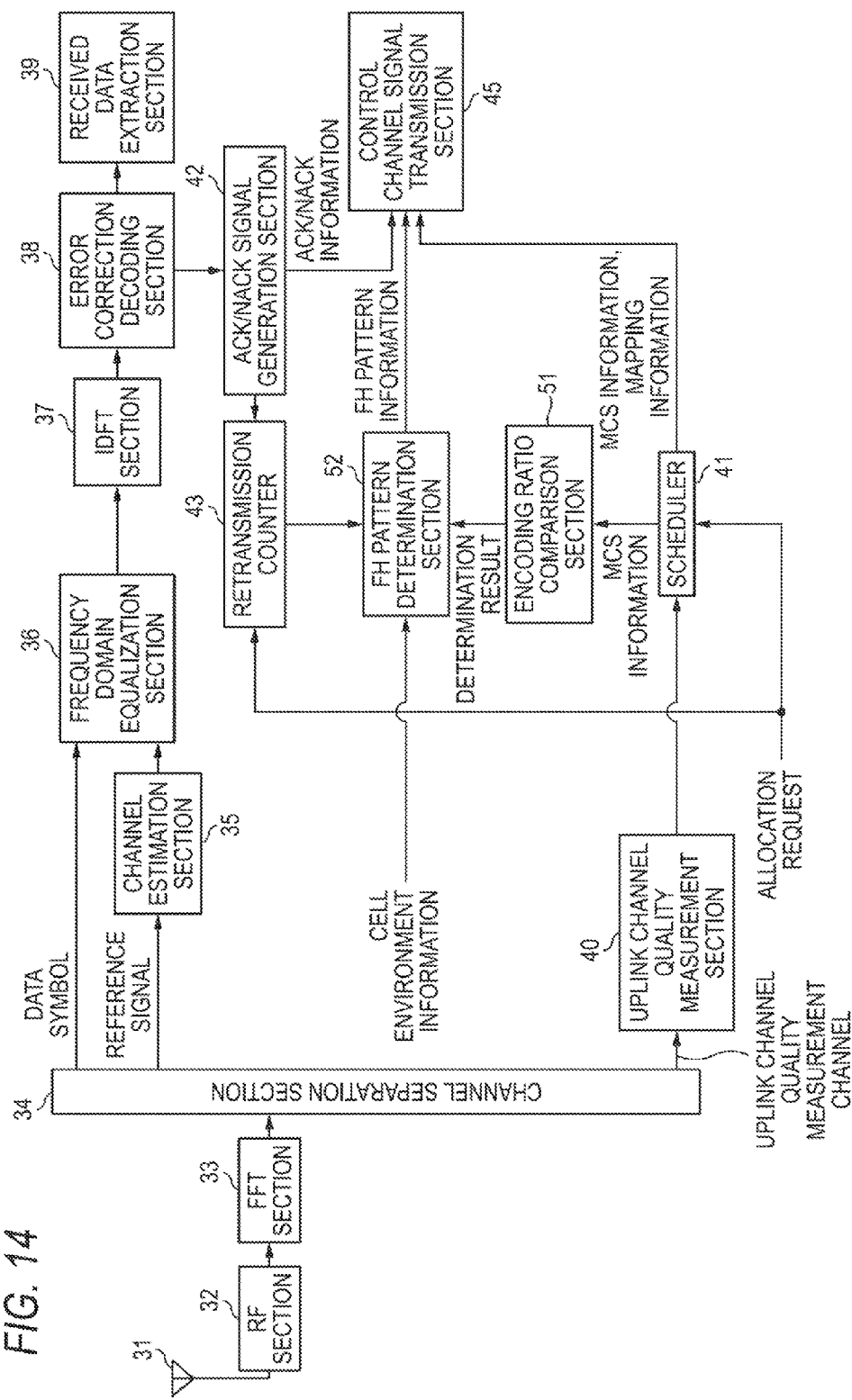
FIG. 14 It is a block diagram showing a configuration of a receiving section of a base station apparatus of a second embodiment.

FIG. 14 is a block diagram showing a configuration of a receiving section of the base station apparatus of the second embodiment. In addition to including the configuration described in connection with the first embodiment by reference to FIG. 8, the receiving section of the base station apparatus of the second embodiment also includes an encoding ratio comparison section 51, and an FH pattern determination section 52 performs different operation. In other respects, the receiving section of the second embodiment is identical with its counterpart of the first embodiment. Like structural elements are assigned like reference numerals, and their explanations are omitted. The encoding ratio comparison section 51 implements a function of an encoding ratio determination section that determines an encoding ratio of transmission data.

The encoding ratio comparison section 51 inputs the MCS information determined by the scheduler 41 and compares an encoding ratio R with a predetermined determination threshold value $T_R$ by use of encoding ratio information included in the MCS information, thereby determining whether the encoding ratio is equal to or less than the threshold value $T_R$. In addition to referring to the cell environment information and the count value of the retransmission counter 43, the FH pattern determination section 52 also makes a reference to the MCS information, thereby determining an FH pattern according to the pieces of information. When the count value of the retransmission counter 43 is zero, the FH pattern determination section 44 determines, from a result of determination made by the encoding ratio comparison section 51, that Intra-FH is possible when the encoding ratio R is equal to or less than the threshold value $T_R$. The FH pattern is determined from the cell environment information, and FH pattern information serving as frequency hopping information for instructing Intra-FH frequency hopping is reported to the mobile station. In the meantime, when the encoding ratio R is greater than the threshold value $T_R$, a determination showing that Intra-FH is not carried out is made, and FH pattern information serving as frequency hopping information for instructing no Intra-FH is reported to the mobile station (FH Pattern=0 is set). When the count value of the retransmission counter 43 is not zero, an FH pattern is determined from the cell environment information in order to carry out Inter/Intra-FH. FH pattern information serving as frequency hopping information for instructing Inter/Intra-FH frequency hopping is reported to the mobile station.

Figure 15:
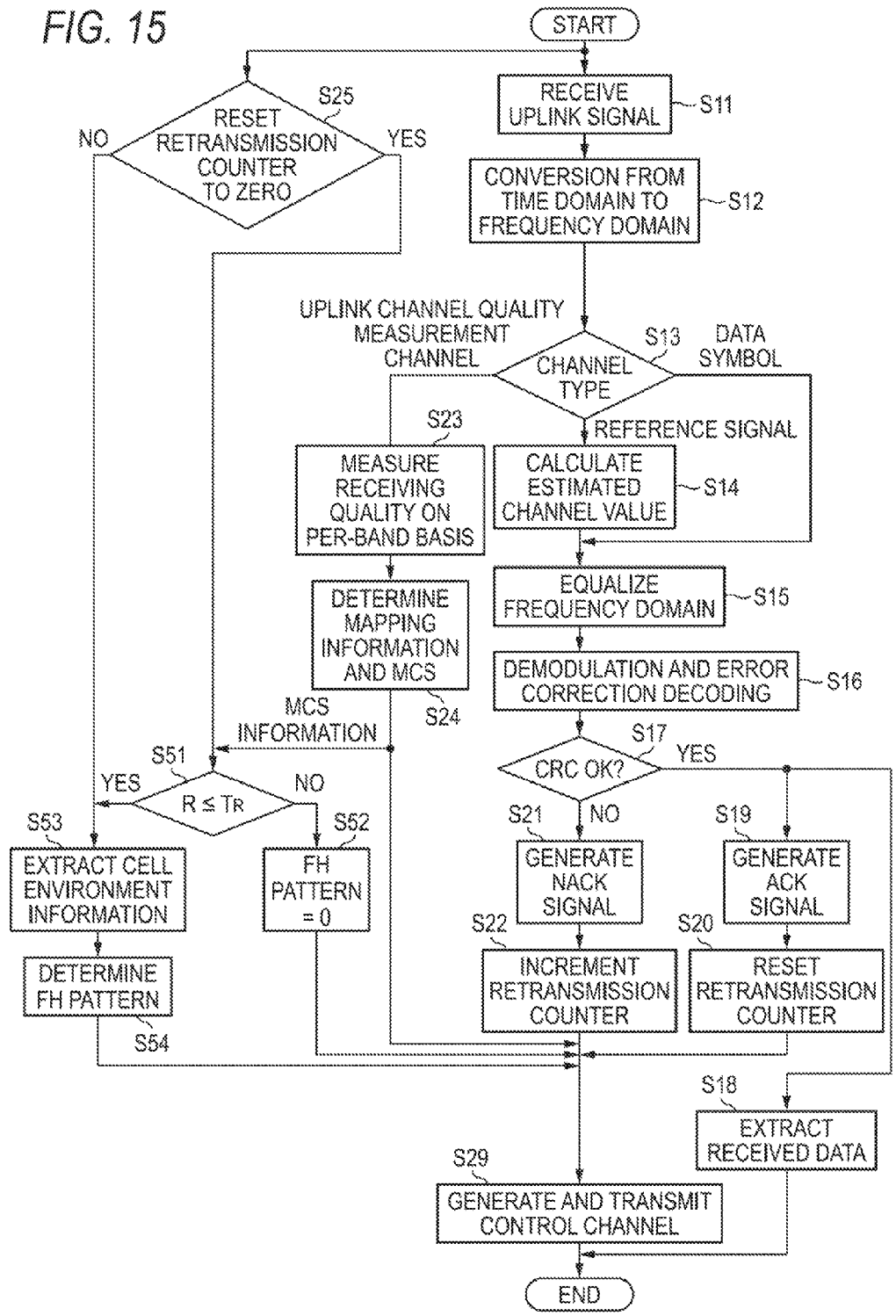
FIG. 15 It is a flowchart showing processing procedures of the receiving section of the base station apparatus of the second embodiment.

FIG. 15 is a flowchart showing processing procedures of the receiving section of the base station apparatus of the second embodiment. In FIG. 15, procedures pertaining to steps S11 to S25 and S29 are identical with those described in connection with the first embodiment by reference to FIG. 10, and hence their repeated explanations are omitted.

When the count value of the retransmission counter 43 is zero in step S25; namely, at the time of first transmission, the encoding ratio comparison section 51 subsequently determines whether the encoding ratio R is equal to or smaller than the threshold value $T_R$, by reference to the MCS information determined in step S24 (step S51). When the encoding ratio R is determined to be greater than the threshold value $T_R$, the FH pattern determination section 52 makes a determination showing that Intra-FH is not carried out, and FH Pattern=0 is set as a value of the FH pattern (step S52). Meanwhile, when the encoding ratio R is determined to be equal to or less than the threshold value $T_R$ in step S51, the FH pattern determination section 52 determines that Intra-FH is applicable and extracts cell environment information (step S53) and determines an FH pattern according to the cell environment information (step S54). In step S25, when the count value of the retransmission counter 43 is not zero; namely, at the time of retransmission, a determination showing that Inter/Intra-FH is performed is made, and cell environment information is extracted (step S53). The FH pattern is determined from the cell environment information (step S54).

The control channel signal transmission section 45 generates and modulates a downlink control channel signal including generated MCS information, mapping information, ACK/NACK information, and FH pattern information and transmits and reports the signal to the mobile station apparatus (step S29).

In the second embodiment, when the encoding ratio is small, Intra-FH is carried out even at the time of first transmission, thereby making it possible to prevent two slots being continually mapped to a frequency band subject to the influence of the frequency selective fading. A chance of acquisition of a much superior throughput can thereby be enhanced.

Third Embodiment

In a third embodiment, the application of frequency hopping is changed according to traveling speed of the mobile station. Specifically, traveling speed of the mobile station is measured by means of a Doppler frequency. When the Doppler frequency is a predetermined value or less, Intra-FH is carried out. When the Doppler frequency is greater than the predetermined value, Intra-FH is not carried out. A throughput characteristic can thereby be enhanced.

In an environment of high speed movement, Intra-FH is not applied. In order to correct phase fluctuations induced by the Doppler frequency, two slots are mapped to the same frequency band, thereby enabling performance of linear interpolation of an estimated channel value of the reference signal. Meanwhile, in an environment of low traveling speed, phase fluctuations induced by the Doppler frequency are negligible. Therefore, in order to prevent both of the two slots from being mapped to a frequency band subject to the influence of the frequency selective fading, it is better to carry out Intra-FH.

Configuration operation of the radio communication unit of the third embodiment is now described. Only operation of a receiver of the base station apparatus is described. Since a transmitter of the mobile station apparatus is identical with that described in connection with the first embodiment by reference to FIGS. 9 and 11, its repeated explanation is omitted.

Figure 16:
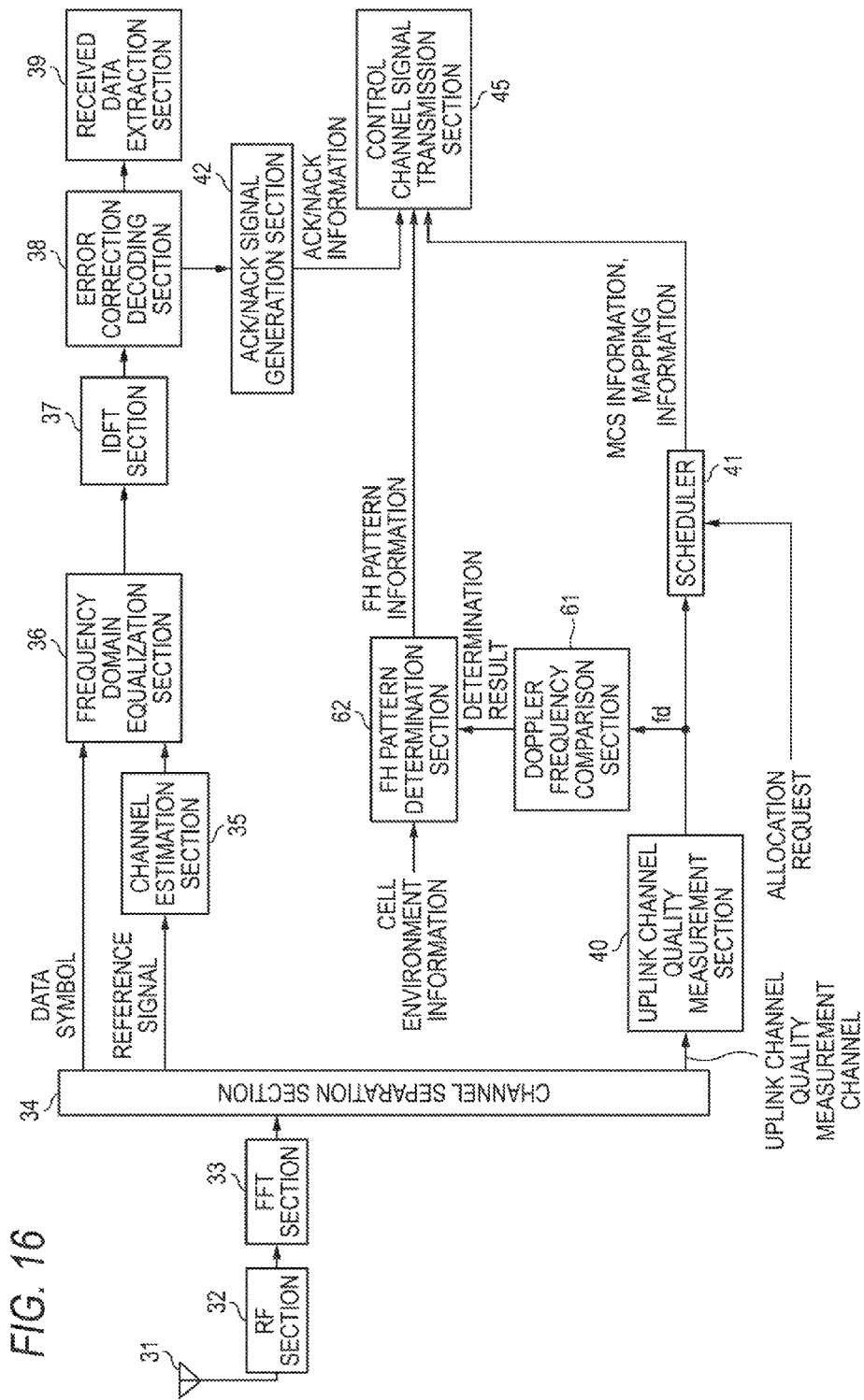
FIG. 16 It is a block diagram showing a configuration of a receiving section of a base station apparatus of a third embodiment.

FIG. 16 is a block diagram showing a configuration of a receiving section of the base station apparatus of the third embodiment. In addition to including the configuration described in connection with the first embodiment by reference to FIG. 8, the receiving section of the base station apparatus of the third embodiment also includes a Doppler frequency comparison section 61, and an FH pattern determination section 62 performs different operation. In other respects, the receiving section of the third embodiment is identical with its counterpart of the first embodiment. Like structural elements are assigned like reference numerals, and their explanations are omitted. The Doppler frequency comparison section 61 implements a function of a Doppler frequency determination section that determines a Doppler frequency of transmission data.

The Doppler frequency comparison section 61 extracts a result of measurement of the Doppler frequency $f_d$ among the results of uplink channel quality measurement performed by the uplink channel quality measurement section 40; compares the Doppler frequency $f_d$ with a predetermined determination threshold value $T_{fd}$, thereby determining whether or not the Doppler frequency is equal to or less than the threshold value $T_{fd}$. The FH pattern determination section 62 makes a reference to the Doppler frequency $f_d$ along with the cell environment information and determines an FH pattern from the information. When the Doppler frequency $f_d$ is equal to or less than the threshold value $T_{fd}$, Intra-FH is determined to be possible. The FH pattern is determined from the cell environment information, and FH pattern information serving as frequency hopping information for instructing Intra-FH frequency hopping is reported to the mobile station. Meanwhile, when the Doppler frequency $f_d$ is greater than the threshold value $T_{fd}$, a determination showing that Intra-FH is not carried out is made. FH pattern information serving as frequency hopping information for instructing no Intra-FH is reported to the mobile station (FH Pattern=0 is set).

Figure 17:
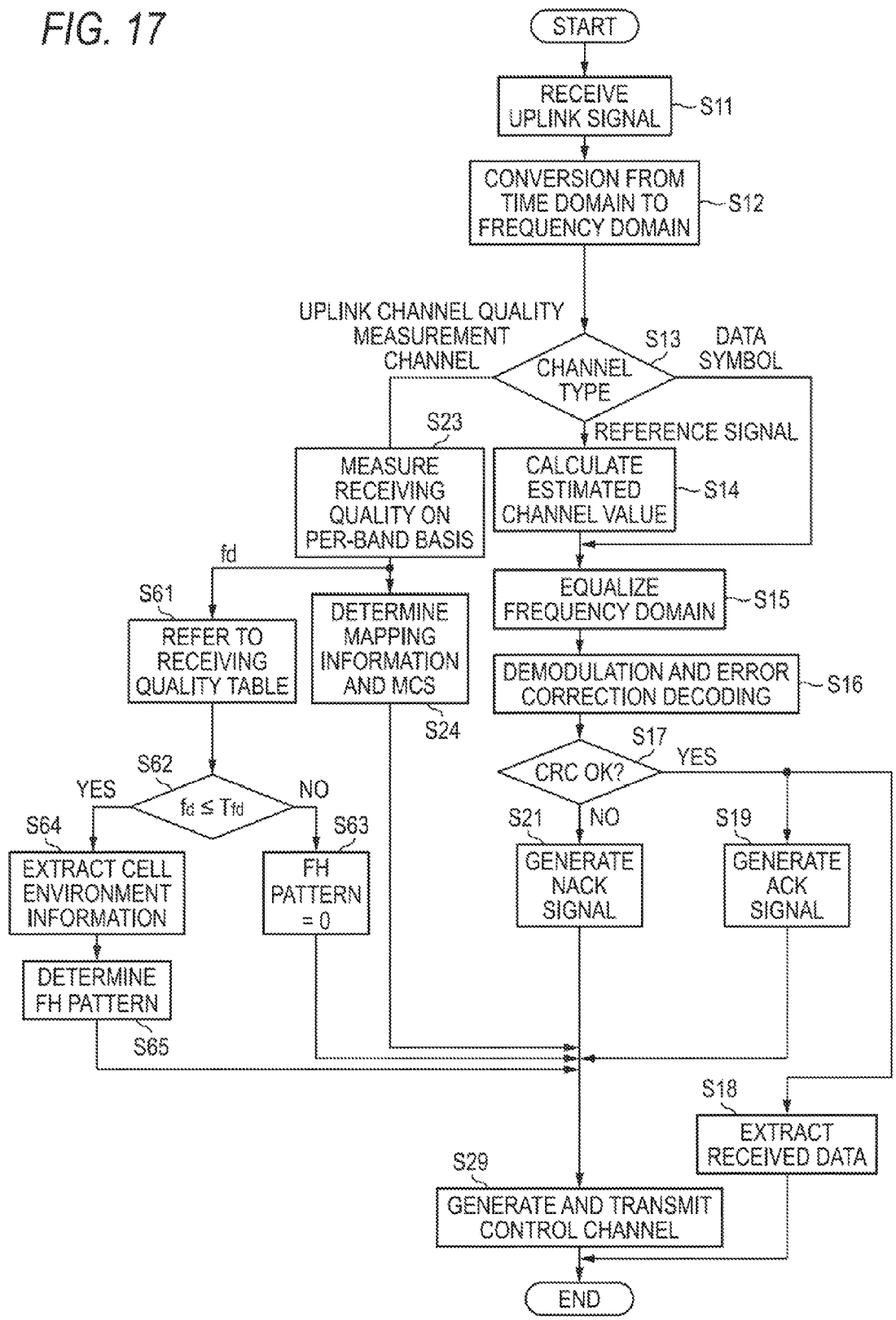
FIG. 17 It is a flowchart showing processing procedures of the receiving section of the base station apparatus of the third embodiment.

FIG. 17 is a flowchart showing processing procedures of the receiving section of the base station apparatus of the third embodiment. In FIG. 17, procedures pertaining to steps S11 to S19, S21, S23, S24, and S29 are the same as their counterparts described in connection with the first embodiment by reference to FIG. 10, and therefore their repeated explanations are omitted. Steps S20, S22, and S25 that are processing pertaining to the retransmission counter are omitted from the third embodiment.

In step S23, after the uplink channel quality measurement section 40 has measured receiving quality for each uplink channel frequency band, the Doppler frequency comparison section 61 makes a reference to a receiving quality table that stores results of measurement of uplink channel quality, thereby extracting the Doppler frequency $f_d$ (step S61). The Doppler frequency comparison section 61 determines whether or not the Doppler frequency $f_d$ is equal to or less than the threshold value $T_{fd}$ (step S62). When the Doppler frequency $f_d$ is greater than the threshold value $T_{fd}$, the FH pattern determination section 62 determines that Intra-FH is not applicable and sets FH Pattern=0 as a value of the FH pattern (step S63). On the contrary, when the Doppler frequency $f_d$ is determined to be the threshold value $T_{fd}$ or less in step S62, the FH pattern determination section 62 determines that Intra-FH is applicable; extracts the cell environment information (step S64); and determines an FH pattern according to the cell environment information (step S65).

In the first and second embodiments, the function for determining whether to apply Intra-FH to first transmission is proposed. In the meantime, in the third embodiment, Intra-FH is made inapplicable at all times without regard to the number of retransmission operations when the Doppler frequency is larger than the threshold value. In this case, Inter-FH can be applied.

In the third embodiment, in the environment of low speed movement involving a small Doppler frequency, it is possible to prevent two slots from being continually mapped to the frequency band subject to the influence of the frequency selective fading by performance of Intra-FH. In the environment of high speed movement involving a large Doppler frequency, application of Intra-FH is made impossible, thereby preventing occurrence of a demodulation error, which would otherwise be caused by phase fluctuations arising between slots in a subframe. It is thereby possible to enhance the chance of the ability to accomplish a superior throughput.

Fourth Embodiment

Figure 18:
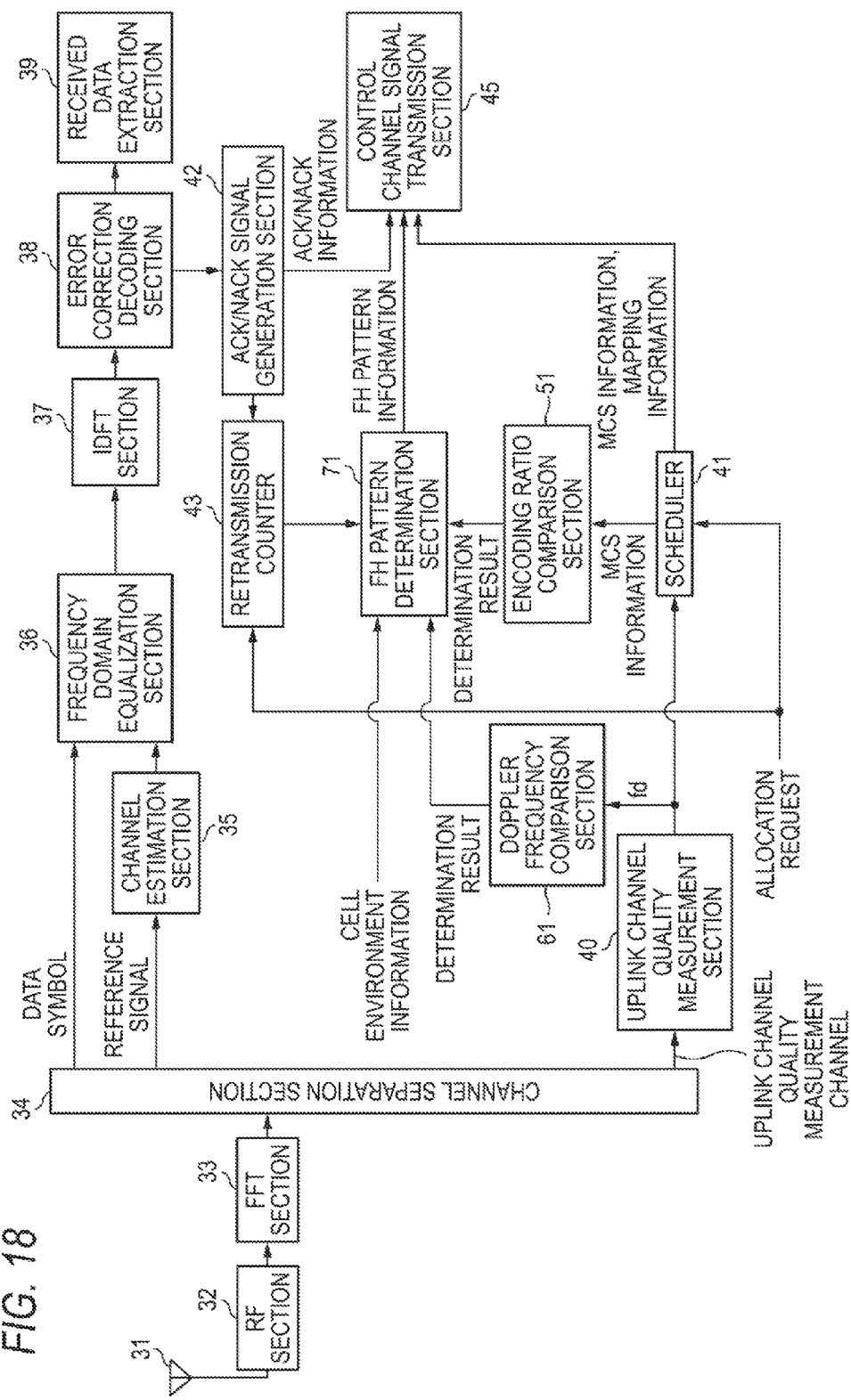
FIG. 18 It is a block diagram showing a configuration of a receiving section of a base station apparatus of a fourth embodiment.
Figure 19:
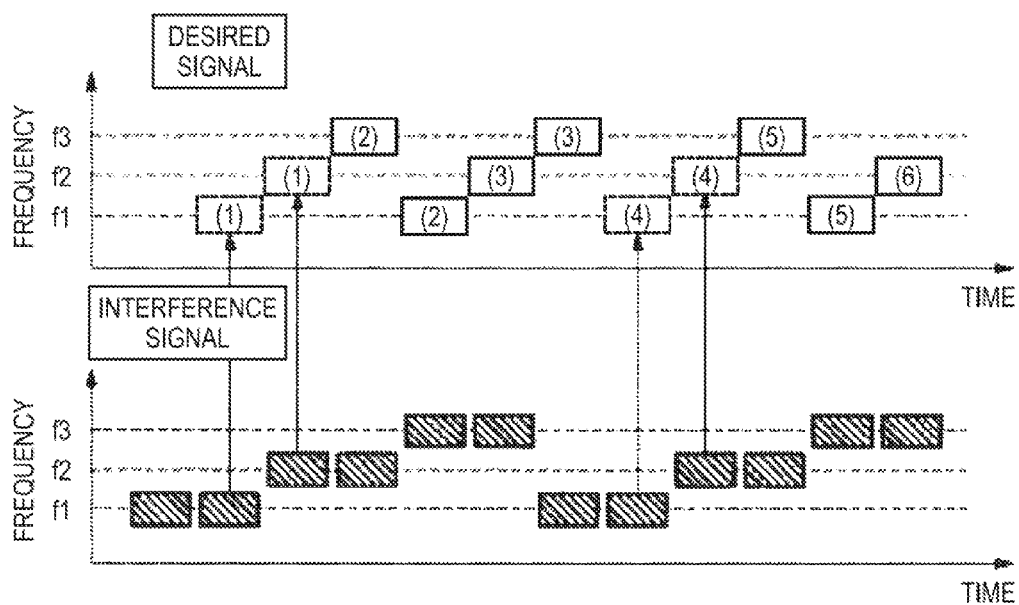
FIGS. 19(a)-19(b) are views showing an example operation of a related art.
Figure 19:
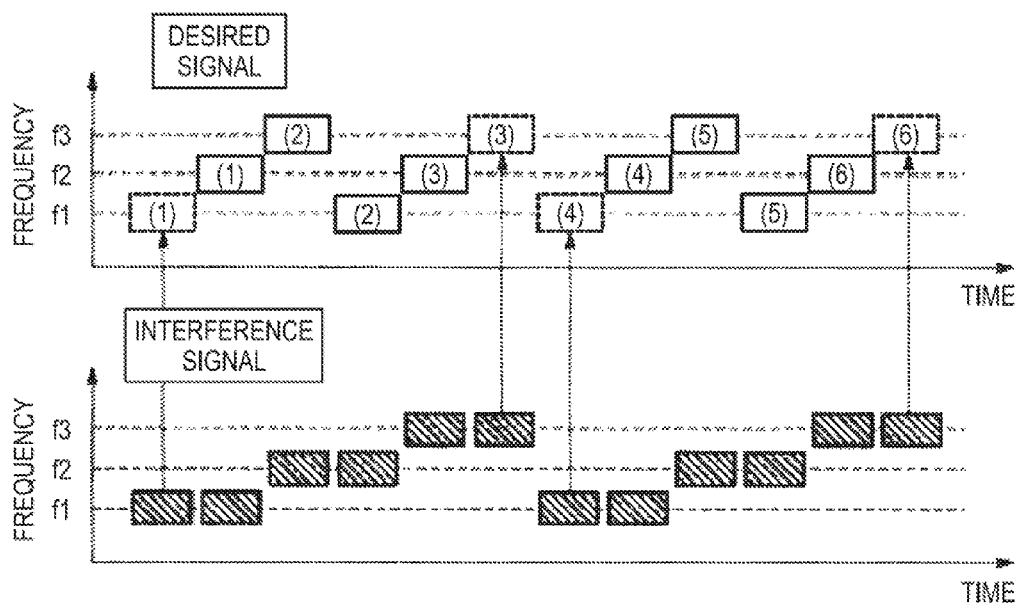

An example, mixed use of the second and third embodiments is illustrated as a fourth embodiment. FIG. 18 is a block diagram showing a configuration of a receiving section of the base station apparatus of the forth embodiment. In addition to including the configuration described in connection with the first embodiment by reference to FIG. 8, the receiving section of the base station apparatus of the fourth embodiment also includes then encoding ratio comparison section 51 and the Doppler frequency comparison section 61, and an FH pattern determination section 71 performs different operation. In other respects, the receiving section of the fourth embodiment is identical with its counterpart of the first embodiment. Like structural elements are assigned like reference numerals, and their explanations are omitted.

The FH pattern determination section 71 determines an FH pattern from a result of comparison among the comparison result of the Doppler frequency $f_d$ performed by the Doppler frequency comparison section 61, the count value of the retransmission counter 43, and the encoding ratio R of the encoding ratio comparison section 51. In the environment of low speed movement in which the Doppler frequency $f_d$ is the threshold value $T_{fd}$ or less, application of Intra-FH is determined to be possible. On the contrary, in the environment of high speed movement in which the Doppler frequency $f_d$ is larger than the threshold value $T_{fd}$, Intra-FT is determined to be inapplicable without regard to the number of retransmission operations. When Intra-FH is inapplicable, no FH (FH Pattern=0) is set, or the FH pattern is determined form the cell environment information by making only Inter-FH applicable, and the FH pattern is reported to the mobile station.

When the count value is determined to be zero by making a reference to the count value of the retransmission counter 43 (i.e., during first transmission), an additional reference is made to the encoding ratio R. When the encoding ratio R is the threshold value $T_R$ or less, Intra-FH is determined to be applicable. The FH pattern is determined from the cell environment information, and the thus-determined FH pattern is reported to the mobile station. Meanwhile, when the encoding ratio R is greater than the threshold value $T_R$, application of Intra-FH to first transmission is determined to be impossible, and the determination is reported to the mobile station.

When the count value of the retransmission counter 43 is not zero (during retransmission), application of Inter/Intra-FH is determined; the FH pattern is determined from the cell environment information; and the FH pattern is reported to the mobile station. When only Inter-FH is applicable, application of Inter-FH during retransmission is determined, and the FH pattern can also be determined from the cell environment information.

According to the fourth embodiment, it becomes possible to address a wider range of environment by combination of the second and third embodiments, and a chance of the ability to acquire a superior throughput in each of the environments can be enhanced.

As mentioned above, in the embodiments, a determination is made, for each of conditions, as to whether or not frequency hopping is applicable, in consideration of effects resultant from frequency hopping of a plurality of patterns under respective types of conditions, such as the number of retransmission operations, an encoding ratio, and traveling speed. Appropriate FH patterns are used in combination such that frequency hopping is applied solely to appropriate conditions. It becomes thereby possible to reduce a possibility of respective slots being mapped to a frequency band subject to influence of frequency selective fading, and receiving performance can be enhanced. Therefore, the present embodiments make it possible to acquire a comprehensively high throughput.

The present invention is not limited to the specifics described in connection with the embodiments and is scheduled to be susceptible to alterations and applications conceived by those who are skilled in the art on the basis of descriptions of the present specification and well-known techniques. The alterations and applications also fall within a range where protection of the present invention is sought.

This patent application is based on Japanese Patent Application (JP-2008-071999) filed on Mar. 19, 2008, the entire subject matter of which is incorporated herein by reference.

INDUSTRIAL APPLICABILITY

The present invention yields an advantage of enabling appropriate application of frequency hopping according to various conditions and enhancing receiving performance even in the case of a communication format that involves a small number of minimum hopping units in one transmission unit, and is useful as a mobile station apparatus and a base station apparatus used in mobile communication, or the like, and also as a communication control method for use with a radio communication system.

The invention claimed is:

1. A mobile station apparatus of a radio communication system that performs transmission on a per-subframe basis, a subframe including a first slot and a second slot which are contiguous to each other in time, the mobile station apparatus uses a communication format capable of performing frequency hopping for allocating the first and second slots to different frequency bands on a per-slot basis or a per-subframe basis and retransmits a first subframe in a subsequent second subframe when an error is detected in a signal transmitted in the first subframe, the mobile station apparatus comprising:
 a control channel signal receiving section that receives a control channel signal reported from a base station apparatus;
 a transmission data generation section configured to generate transmission data, the transmission data being data of an initial transmission and data of a retransmission;
 a frequency band mapping section that maps a frequency band for the transmission data according to frequency hopping information included in the control channel signal; and
 a transmission section that transmits the mapped transmission data to the base station apparatus,
 wherein the frequency band mapping section is configured to
  1) map a first slot and a second slot of a first subframe for he initial transmission data to a first single frequency band, and
  (2) at least one of map a first slot and a second slot of the second subframe for the retransmission data to mutually-different frequency bands and map the first slot and the second slot of the second subframe for the retransmission data to a second single frequency band, the second single frequency band distinguished from the first single frequency band, and the second subframe being a retransmission of the first subframe.

2. The mobile station apparatus according to claim 1, wherein the frequency band mapping section performs intra-subframe frequency hopping for allocating the first slot and the second slot of the first subframe and the first slot and the second slot of the second subframe to the single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

3. A mobile station apparatus of a radio communication system that performs transmission on a per-subframe basis, a subframe including a first slot and a second slot which are contiguous to each other in time, the mobile station apparatus uses a communication format capable of performing frequency hopping for allocating the first and second slots to different frequency bands on a per-slot basis or a per-subframe basis; retransmits a first subframe in a subsequent second subframe when an error is detected in a signal transmitted in the first subframe, the mobile station apparatus comprising:
 a control channel signal receiving section that receives a control channel signal reported from a base station apparatus;
 a frequency band mapping section that maps a frequency band of transmission data according to frequency hopping information included in the control channel signal; and a transmission section that transmits the mapped transmission data to the base station apparatus, wherein the frequency band mapping section performs intra-subframe frequency hopping for allocating a first slot and a second slot of the first subframe to a single frequency band when an encoding ratio of the transmission data is greater than a predetermined threshold value and allocating the first slot and the second slot to mutually-different frequency bands when the encoding ratio is equal to or smaller than the predetermined threshold value; and the frequency band mapping section performs at least either intra-subframe frequency hopping for allocating a first slot and a second slot of the second subframe to mutually-different frequency bands or inter-subframe frequency hopping for allocating the first subframe and the second subframe to mutually-difference frequency bands.

4. The mobile station apparatus according to claim 3, wherein the frequency band mapping section performs intra-subframe frequency hopping for allocating the first slot and the second slot of the first subframe and the first slot and the second slot of the second subframe to the single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

5. A mobile station apparatus of a radio communication system that performs transmission on a per-subframe basis, a subframe including a first slot and a second slot which are contiguous to each other in time, the mobile station apparatus uses a communication format capable of performing frequency hopping for allocating the first and second slots to different frequency bands on a per-slot basis or the per-subframe basis, the mobile station apparatus comprising:

a control channel signal receiving section that receives a control channel signal reported from a base station apparatus;

a frequency band mapping section that maps a frequency band of transmission data according to frequency hopping information included in the control channel signal; and a transmission section that transmits the mapped transmission data to the base station apparatus, wherein the frequency band mapping section performs intra-subframe frequency hopping for allocating the first slot and the second slot of the subframe to a single frequency band when a Doppler frequency of the transmission data is larger than a predetermined threshold value and allocating the first slot and the second slot of the subframe to mutually-different frequency bands when the Doppler frequency is equal to or smaller than the predetermined threshold value.

6. A base station apparatus of a radio communication system that performs transmission on a per-subframe basis, a subframe including a first slot and a second slot which are contiguous to each other in time, the base station apparatus uses a communication format capable of performing frequency hopping for allocating the first and second slots to different frequency bands on a per-slot basis or a per-subframe basis and retransmits a first subframe in a subsequent second subframe when an error is detected in a signal transmitted in the first subframe, the base station apparatus comprising:

a receiving section that receives a signal transmitted from a mobile station apparatus;

a frequency hopping pattern determination section configured to determine, based on a number of times transmission data from the mobile station apparatus is retransmitted, an application of frequency hopping with regard to the transmission data and a frequency hopping pattern, the transmission data being data of initial transmission when the number of times is 0 and the transmission data being data of retransmission when the number of times is more than 0;

a retransmission count acquisition section coupled to the frequency hopping pattern determination section, the retransmission count acquisition section configured to acquire the number of times the transmission data is retransmitted; and a control channel signal transmission section configured to generate a control channel signal including frequency hopping pattern information identifying the frequency hopping pattern, the control channel signal transmission section being further configured to transmit the control channel signal to the mobile station apparatus, wherein the frequency hopping pattern information identifies a frequency hopping pattern that
  (1) allocates a first slot and a second slot of the first subframe to be transmitted to a first single frequency for the data of initial transmission, and
  (2) at least one of allocates a first slot and a second slot of the second subframe to mutually-different frequency bands and allocates the first slot and the second slot of the second subframe to a second single frequency for the data of retransmission, the second single frequency distinguished from the first single frequency and the second subframe being a retransmission of the first subframe.

7. The base station apparatus according to claim 6, further comprising:

a Doppler frequency determination section that determines a Doppler frequency of the transmission data, wherein the frequency hopping pattern determination section determines the frequency hopping pattern for performing intra-subframe frequency hopping for allocating the first slot and the second slot of the first subframe and the first slot and the second slot of the second subframe to a single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

8. A base station apparatus of a radio communication system that performs transmission on a per-subframe basis, a subframe including a first slot and a second slot which are contiguous to each other in time, the base station apparatus uses a communication format capable of performing frequency hopping for allocating the first and second slots to different frequency bands on a per-slot basis or the per-subframe basis and retransmits a first subframe in a subsequent second subframe when an error is detected in a signal transmitted in the first subframe, the base station apparatus comprising:

a receiving section that receives a signal transmitted from a mobile station apparatus;

a frequency hopping pattern determination section that determines application of frequency hopping with regard to transmission data transmitted from the mobile station apparatus and that determines a frequency hopping pattern;

a retransmission count acquisition section that acquires a number of times where the transmission data is retransmitted;
an encoding ratio determination section that determines an encoding ratio of the transmission data; and
a control channel signal transmission section that generates a control channel signal including frequency hopping information for instructing the frequency hopping pattern and that transmits the control channel signal to the mobile station apparatus,
wherein the frequency hopping pattern determination section determines, based on the number of times where the transmission data is retransmitted and the encoding ratio, the frequency hopping pattern for performing intra-subframe frequency hopping for allocating to a single frequency band a first slot and a second slot of the first subframe to be transmitted first time when the encoding ratio of the transmission data is larger than a predetermined threshold value and allocating the first slot and the second slot to mutually-different frequency bands when the encoding ratio is equal to or smaller than the predetermined threshold value and at least either intra-subframe frequency hopping for allocating a first slot and a second slot of the second subframe to be retransmitted to mutually-different frequency bands or inter-subframe frequency hopping for allocating the first subframe and the second subframe to mutually-different frequency bands.

9. The base station apparatus according to claim 8, further comprising:
a Doppler frequency determination section that determines a Doppler frequency of the transmission data,
wherein the frequency hopping pattern determination section determines the frequency hopping pattern for performing intra-subframe frequency hopping for allocating the first slot and the second slot of the first subframe and the first slot and the second slot of the second subframe to a single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

10. A base station apparatus of a radio communication system that performs transmission on a per-subframe basis, a subframe including a first slot and a second slot which are contiguous to each other in time, the base station apparatus uses a communication format capable of performing frequency hopping for allocating the first and second slots to different frequency bands on a per-slot basis or the per-subframe basis, the base station apparatus comprising:
a receiving section that receives a signal transmitted from a mobile station apparatus;
a frequency hopping pattern determination section that determines application of frequency hopping with regard to transmission data transmitted from the mobile station apparatus and that determines a frequency hopping pattern;
a Doppler frequency determination section that determines a Doppler frequency of the transmission data; and
a control channel signal transmission section that generates a control channel signal including frequency hopping information for instructing the frequency hopping pattern and that transmits the control channel signal to the mobile station apparatus,
wherein the frequency hopping pattern determination section determines the frequency hopping pattern for performing intra-subframe frequency hopping for allocating the first slot and the second slot of the subframe to a single frequency band when the Doppler frequency of the transmission data is larger than a predetermined threshold value and allocating the first slot and the second slot of the subframe to mutually-different frequency bands when the Doppler frequency is equal to or smaller than the predetermined threshold value.

11. A communication control method for use with a radio communication system that performs transmission on a per-subframe basis, a subframe including a first slot and a second slot which are contiguous to each other in time the method using a communication format capable of performing frequency hopping for allocating the first and second slots to different frequency bands on a per-slot basis or the per-subframe basis and retransmitting a first subframe in a subsequent second subframe when an error is detected in a signal transmitted in the first subframe, the method comprising:
a receiving step of receiving a signal transmitted from a mobile station apparatus to a base station apparatus;
a frequency hopping pattern determination step of
(1) determining, based on a number of times transmission data from a mobile station apparatus is retransmitted, an application of frequency hopping with regard to the transmission data, the transmission data being an initial transmission when the number of times is 0, the transmission data being a retransmission when the number of times is more than 0, and
(2) determining, a frequency hopping pattern; and
a retransmission count acquisition step of acquiring the number of times the transmission data is retransmitted; and
a control channel signal transmission step of generating a control channel signal including frequency hopping pattern information for identifying the frequency hopping pattern and transmitting the control channel signal to the mobile station apparatus,
wherein, the frequency hopping pattern information includes instructions for
(1) allocating a first slot and a second slot of the first subframe for data of the initial transmission to a first single frequency band, and
(2) at least one of allocating a first slot and a second slot of the second subframe to mutually-different frequency bands and allocating the first slot and the second slot of the second subframe to a second single frequency band for data of the retransmission, the second single frequency distinguished from the first single frequency and the second subframe being a retransmission of the first subframe.

12. The communication control method according to claim 11, further comprising:
a Doppler frequency determination step of determining a Doppler frequency of the transmission data,
wherein, in the frequency hopping pattern determination process, it is determined the frequency hopping pattern for performing intra-subframe frequency hopping for allocating the first slot and the second slot of the first subframe and the first slot and the second slot of the second subframe to a single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

13. A communication control method for use with a radio communication system that performs transmission on a per-subframe basis, a subframe including a first slot and a second slot which are contiguous to each other in time, the method using a communication format capable of performing frequency hopping for allocating the first and second slots to different frequency bands on a per-slot basis or the per-subframe basis and retransmitting a first subframe in a subsequent second subframe when an error is detected in a signal transmitted in the first subframe, the method comprising:
- a receiving step of receiving a signal transmitted from a mobile station apparatus to a base station apparatus;
- a frequency hopping pattern determination step of determining application of frequency hopping with regard to transmission data transmitted from the mobile station apparatus and determining a frequency hopping pattern;
- a retransmission count acquisition step of acquiring a number of times where the transmission data is retransmitted;
- an encoding ratio determination step of determining an encoding ratio of the transmission data; and
- a control channel signal transmission step of generating a control channel signal including frequency hopping information for instructing the frequency hopping pattern and that transmits the control channel signal to the mobile station apparatus,
- wherein, in the frequency hopping pattern determination process, it is determined, based on the number of times where the transmission data is retransmitted and the encoding ratio, the frequency hopping pattern for performing intra-subframe frequency hopping for allocating to a single frequency band a first slot and a second slot of the first subframe to be transmitted first time when the encoding ratio of the transmission data is larger than a predetermined threshold value and allocating the first slot and the second slot to mutually-different frequency bands when the encoding ratio is equal to or smaller than the predetermined threshold value and at least either intra-subframe frequency hopping for allocating a first slot and a second slot of the second subframe to be retransmitted to mutually-different frequency bands or inter-subframe frequency hopping for allocating the first subframe and the second subframe to mutually-different frequency bands.

14. The communication control method according to claim 13, further comprising:
- a Doppler frequency determination step of determining a Doppler frequency of the transmission data,
- wherein, in the frequency hopping pattern determination process, it is determined the frequency hopping pattern for performing intra-subframe frequency hopping for allocating the first slot and the second slot of the first subframe and the first slot and the second slot of the second subframe to a single frequency band when the Doppler frequency of the transmission data is larger than the predetermined threshold value and for allocating the first slot and the second slot of at least the second subframe to mutually-different frequency bands when the Doppler frequency is equal to or smaller than the predetermined threshold value.

15. A communication control method for use with a radio communication system that performs transmission on a per-subframe basis, a subframe including a first slot and a second slot which are contiguous to each other in time, the method using a communication format capable of performing frequency hopping for allocating the first and second slots to different frequency bands on a per-slot basis or the per-subframe basis, the method comprising:
- a receiving step of receiving a signal transmitted from a mobile station apparatus to a base station apparatus;
- a frequency hopping pattern determination step of determining application of frequency hopping with regard to transmission data transmitted from the mobile station apparatus and determining a frequency hopping pattern;
- a Doppler frequency determination step of determining a Doppler frequency of the transmission data; and
- a control channel signal transmission step of generating a control channel signal including frequency hopping information for instructing the frequency hopping pattern and that transmits the control channel signal to the mobile station apparatus,
- wherein, in the frequency hopping pattern determination process, it is determined the frequency hopping pattern for performing intra-subframe frequency hopping for allocating the first slot and the second slot of the subframe to a single frequency band when the Doppler frequency of the transmission data is larger than a predetermined threshold value and allocating the first slot and the second slot of the subframe to mutually-different frequency bands when the Doppler frequency is equal to or smaller than the predetermined threshold value.

* * * * *